US007516541B2

(12) United States Patent
Furuya et al.

(10) Patent No.: US 7,516,541 B2
(45) Date of Patent: Apr. 14, 2009

(54) TERMINAL INSERTING APPARATUS

(75) Inventors: Hiroshi Furuya, Shizuoka (JP); Kazuhiko Sugimura, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 264 days.

(21) Appl. No.: 11/231,747

(22) Filed: Sep. 22, 2005

(65) Prior Publication Data

US 2006/0064870 A1 Mar. 30, 2006

(30) Foreign Application Priority Data

Sep. 28, 2004 (JP) ............................ 2004-281386

(51) Int. Cl.
*B23P 19/00* (2006.01)
*H01R 43/20* (2006.01)

(52) U.S. Cl. ............................ 29/747; 29/748; 29/760; 29/874; 439/595

(58) Field of Classification Search ........... 29/745-748, 29/755, 33 M, 33 F, 876-884, 564.4, 564.6; 439/752, 595, 596, 603
See application file for complete search history.

(56) References Cited

U.S. PATENT DOCUMENTS 4,147,566 A * 4/1979 Leonard ..................... 148/248
4,581,796 A * 4/1986 Fukuda et al. ............. 29/33 M
5,127,159 A * 7/1992 Kudo et al. .................... 29/863
5,355,583 A * 10/1994 Osumi et al. .................. 29/876
5,457,875 A * 10/1995 Ohta et al. ..................... 29/748
5,515,601 A * 5/1996 Maejima ....................... 29/748
5,581,873 A * 12/1996 Okura et al. .................. 29/760
5,666,718 A * 9/1997 Onishi et al. .................. 29/748
5,774,981 A * 7/1998 Maejima et al. ............... 29/861
5,850,694 A * 12/1998 Maejima ....................... 29/884
6,173,488 B1 * 1/2001 Endo et al. ..................... 29/747
6,212,766 B1 * 4/2001 Ohsumi et al. ................ 29/755
7,441,327 B2 * 10/2008 Furuya et al. ................. 29/748

* cited by examiner

*Primary Examiner*—Minh Trinh
(74) *Attorney, Agent, or Firm*—Kratz, Quintos & Hanson, LLP

(57) ABSTRACT

Providing a terminal inserting apparatus which does not give a limitation to an assembled wiring harness thereby, the terminal inserting apparatus includes a jig mounting unit, a housing holding unit, an inserting unit and a jig transporting unit. The jig mounting unit has a plurality of holding jigs. The holding jig has a connector housing. The housing holding unit has one holding jig including the connector housing. The inserting unit inserts the terminal 6 connected with the electric wire into a terminal receiving chamber of the connector housing. The jig transporting unit transports the holding jig from the jig mounting unit to the housing holding unit.

3 Claims, 36 Drawing Sheets

TERMINAL INSERTING APPARATUS

The priority application Number Japan Patent Application No. 2004-281386 upon which this patent application is based is hereby incorporated by reference.

BACKGROUND OF THE INVENTION

1. Field of the Invention

This invention relates to a terminal-inserting apparatus for inserting a terminal, connected with an electric wire, into a terminal receiving chamber of a connector housing.

2. Description of the Related Art

A wiring harness wired in a car as a vehicle is assembled by inserting terminals connected with the electric wire in order into the terminal receiving chamber of the connector housing. For inserting the terminal into the terminal receiving chamber of the connector housing, usual various terminal-inserting apparatuses 200 (shown in FIG. 38) is applied.

The terminal-inserting apparatus 200 has a main body, a plurality of holding jigs 201 for holding the connector housing, a bar for holding the electric wire and an insertion head for inserting the terminal. The main body is placed on a floor of a factory.

The holding jig 201 is mounted on the main body and simultaneously mounts the connect housing on itself. The plurality of holding jigs 201 is arranged in the straight line. The insertion head removes an electric wire 202 (shown in FIG. 38) from the bar and inserts the terminal connected with the electric wire 202 into the terminal receiving chamber of the connector housing.

In the terminal-inserting apparatus 200, the insertion head removes each electric wire 202 from the bar and inserts the terminal jointed with the electric wire 202 into the terminal receiving chamber of the connector housing held in the holding jig 201 one by one. Thus, the terminal-inserting apparatus 200 assembles the wiring harness.

SUMMARY OF THE INVENTION

Objects to be Solved

According to the usual terminal-inserting apparatus 200 mentioned above, the plurality of holding jigs 201 is arranged in a straight line. Therefore, the electric wire 202 must be elongated longer than an interval between the holding jigs 201 to hold the connector housings, into which each terminal connected with both ends of the electric wire 202 is inserted. Into the connector housings, held in the holding jigs 201 most distant from each other in FIG. 38, the terminals connected the both end of a short electric wire 202 shown with a dashed line in FIG. 38 cannot be inserted. Thus, the wiring harness, which can be assembled in the usual terminal-inserting apparatus 200, is limited.

To overcome the above problem, one object of the present invention is to provide a terminal-inserting apparatus, which limits a wiring harness to be assembled therein.

How to Attain the Object of the Present Invention

In order to attain the object of the present invention, a terminal-inserting apparatus according to an aspect of the present invention, holds a connector housing in a holding jig and inserts a terminal connected with an electric wire into a terminal receiving chamber of the connector housing, and is characterized in that it includes a jig mounting unit for mounting a plurality of the holding jigs; an inserting/mounting unit for mounting any one holding jig of the plurality of holding jigs and inserting the terminal into the terminal receiving chamber of the connector housing held in the any one holding jig; and a jig transporting unit for picking up one holding jig of the plurality of holding jigs mounted on the jig mounting unit from the jig mounting unit, and transporting the one holding jig to the inserting/mounting unit.

The terminal-inserting apparatus according to another aspect of the present invention is characterized in the terminal-inserting apparatus mentioned above in that the plurality of holding jigs mounted on the jig mounting unit is arranged in a straight line, and the jig transporting unit includes a pulling-out unit moving freely both in a first direction parallel to the straight line where the plurality of holding jigs is arranged and in a second direction intersecting with the first direction, and penetrating through the jig mounting unit to push up one holding jig of the plurality of the holding jigs for pulling out the one holding jig from the jig mounting unit.

The terminal-inserting apparatus according to a further aspect of the present invention is characterized in the terminal-inserting apparatus mentioned above in that the jig transporting unit includes a griping device moving freely in the second direction, and approaching from an upper side to the one holding jig pushed up by the pulling-out unit and gripping the one holding jig for transporting the one holding jig to the inserting/mounting unit.

The terminal-inserting apparatus according to further aspect of the present invention is characterized in the terminal-inserting apparatus mentioned above in that the jig transporting unit includes a plurality of gripping devices mentioned above.

According to the above structure, the jig transporting unit transports the one holding jig of the plurality of holding jigs mounted on the jig mounting unit to the inserting/mounting unit, and the terminal is inserted into the connector housing to be held by the holding jig transported to the inserting/mounting unit. Thereby, it is not required that the electric wire is elongated longer than an interval between the holding jigs.

According to the above structure, the jig transporting unit includes the pulling-out unit for pushing-up one holding jig from the jig mounting unit. Therefore, an interval between the holding jigs in the jig mounting unit can be smaller than that of the case that approaching the holding jig from upper side of the jig mounting unit and gripping the holding jig.

According to the above structure, the jig transporting unit includes the griping device moving freely in the second direction and gripping the one holding jig to be pushed up by the pulling-out unit. Thereby, the holding jig can be transported securely from the jig mounting unit to the inserting/mounting unit. Furthermore, the griping device can move freely in the second direction, but not freely in the first direction, so that the terminal-inserting apparatus can be miniaturized comparing with the case of making the gripping device freely movable in the first direction.

According to the above structure, the jig transporting unit includes the plurality of gripping devices, so that one gripping device can transport the holding jig from the pulling-out unit to the inserting/mounting unit and the other gripping device can transport the holding jig from the inserting/mounting unit to the pulling-out unit.

Effects of the Present Invention

According to the present invention, it is not required that the electric wire must be longer than the interval between the holding jigs. Therefore, the terminal-inserting apparatus does not require limits to the wiring harness to be assembled.

According to the present invention, the interval between the holding jigs in the jig mounting unit can be reduced. Therefore, the terminal-inserting apparatus can be miniaturized.

According to the present invention, the holding jig can be transported securely from jig mounting unit to the inserting/mounting unit. The terminal-inserting apparatus also can be miniaturized.

According to the present invention, one gripping device can transport the holding jig from the pulling-out unit to the inserting/mounting unit and the other gripping device can transport the holding jig from the inserting/mounting unit to the pulling-out unit. Therefore, operating time can be reduced.

The above and other objects and features of this invention will become more apparent from the following description taken in conjunction with the accompanying drawings.

DESCRIPTION OF THE PREFERRED EMBODIMENT

Figure 1:
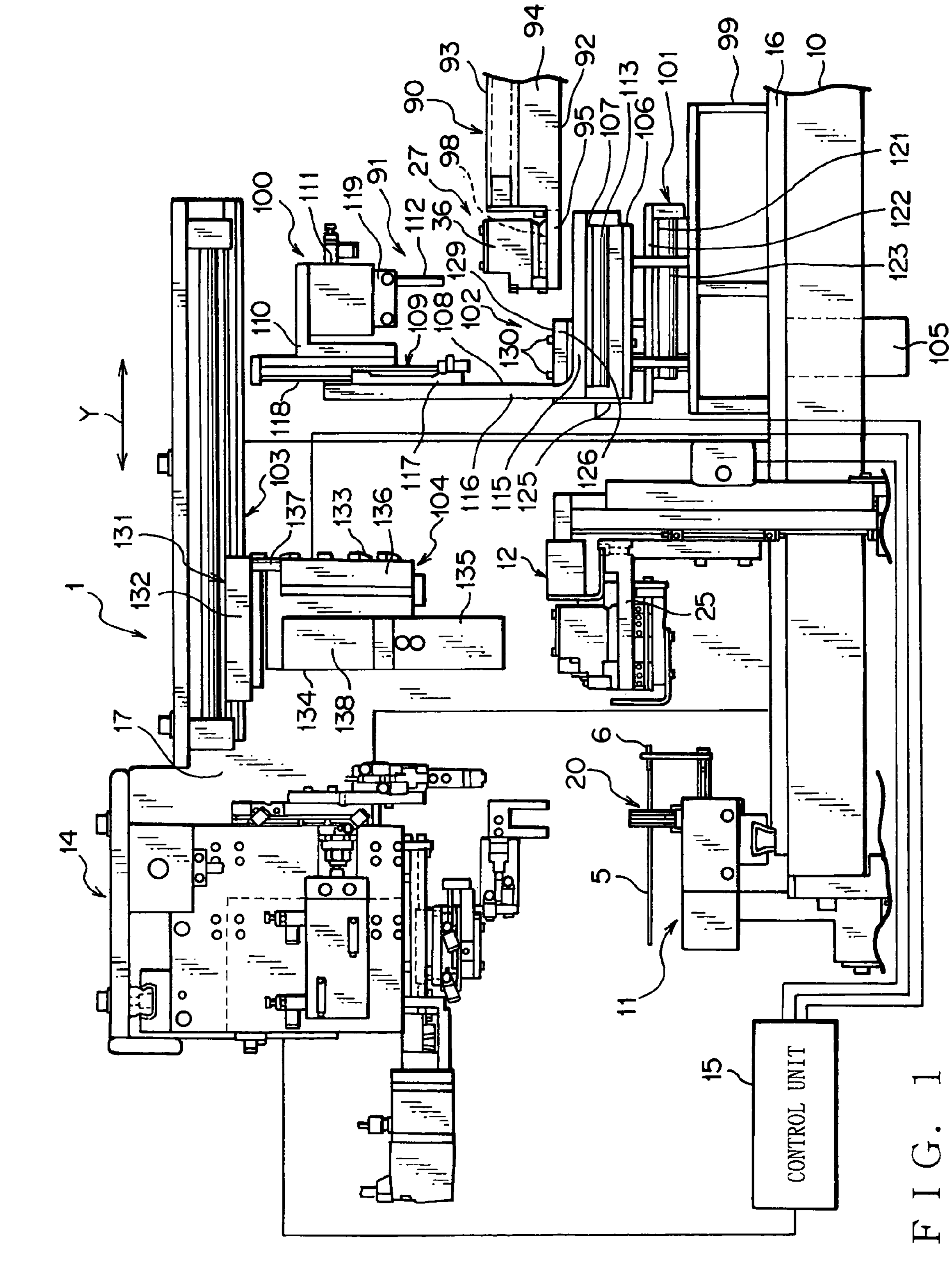
FIG. 1 is a side view showing a structure of a terminal inserting apparatus of an embodiment according to the present invention.

A terminal-inserting apparatus 1 of an embodiment according to the present invention will be described with reference to FIGS. 1-37. The terminal-inserting apparatus 1 (shown in FIG. 1) is an apparatus for inserting a terminal 6 connected with an electric wire 5 into each terminal receiving chamber 4 of a connector housing 3 of a connector 2 shown in FIG. 2.

The connector housing 3 is made of insulating synthetic resin and formed into rectangular-solid shape. The connector housing 3 has a plurality of terminal receiving chambers 4. The terminal receiving chamber 4 is a hole (opening) penetrating the connector housing 3 and extending straight. The terminal receiving chamber 4 receives the terminal 6 connected with the electric wire 5.

The terminal 6 is connected with the electric wire 5. The electric wire 5 is a covered wire having a conductive core sire and an insulating cover.

The connector housing 3 forms the connector 2 by receiving the terminal 6 connected with the electric wire 5 in the predetermined terminal receiving chamber 4. The connector 2 is connected with a mating connector to form a wiring harness wired in a car. One of the terminal receiving chamber 4 and the terminal 6 has a locking arm engaging with the other of the terminal receiving chamber 4 and the terminal 6. The locking arm engages with the other thereof, so that the connector housing 3 and the terminal 6 connected with the electric wire 5 are locked with each other. The connector 2 having a different part number has a different outer appearance. For example, the connector 2 having a different part number has a different number of the terminal receiving chambers 4 and a different position of the terminal receiving chambers 4.

The terminal-inserting apparatus 1 includes a main body 10, a jig mounting unit 90, a jig transporting unit 91, a wire holding unit 11 as the bar for holding the electric wire, a housing holding unit 12, a guide unit 13 (shown in FIG. 5), an inserting unit 14 for inserting the terminal 6, and a control unit 15.

The main body 10 is installed on a floor of a factory. The main body 10 includes a table 16 having a flat top surface along a horizontal direction, a vertical column 17 and a vertical wall 18. The vertical column 17 and the vertical wall 18 extend upwardly from the top surface of the table 16.

Figure 2:
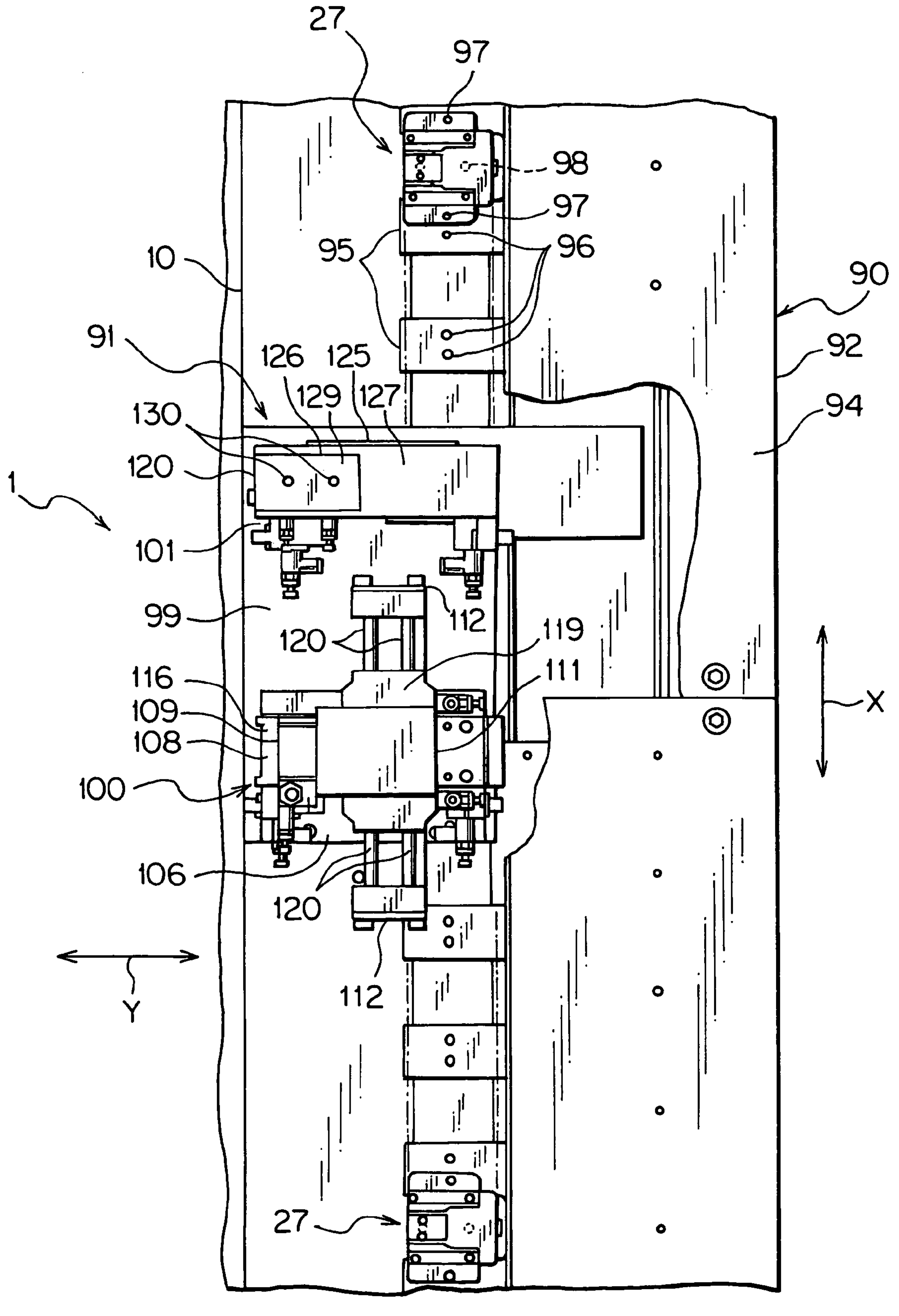
FIG. 2 is a plan view showing a jig transporting unit of the terminal inserting apparatus in FIG. 1.

The jig mounting unit 90 has a jig mount tray 92 attached on the main body 10 and a housing supplier 93 (shown in FIG. 1) as shown in FIGS. 1, 2. The jig mount tray 92 includes an attachment 94 attached on the main body and a plurality of jig mount blocks 95 as shown in FIG. 2. The attachment 94 extends straight. The jig mount blocks 95 project from the attachment 94 toward the inserting unit 14, and are arranged with a space along lengthwise of the attachment 94. The jig mount block 95 is provided with a positioning pin 96, for positioning the holding jig 27, projecting upwardly. A later-described pushing-up tray 126 of a jig pushing-up unit 102 can penetrate from a bottom side between the jig mount blocks 95 adjacent to each other.

The housing supplier 93 is provided correspondingly to each holding jig 27 to be mounted on the jig mount tray 92. The housing supplier 93 is formed into a cylindrical shape for receiving the connector housing 3, which is held by the holding jig 27 corresponding to the housing supplier, inside thereof.

Figure 4:
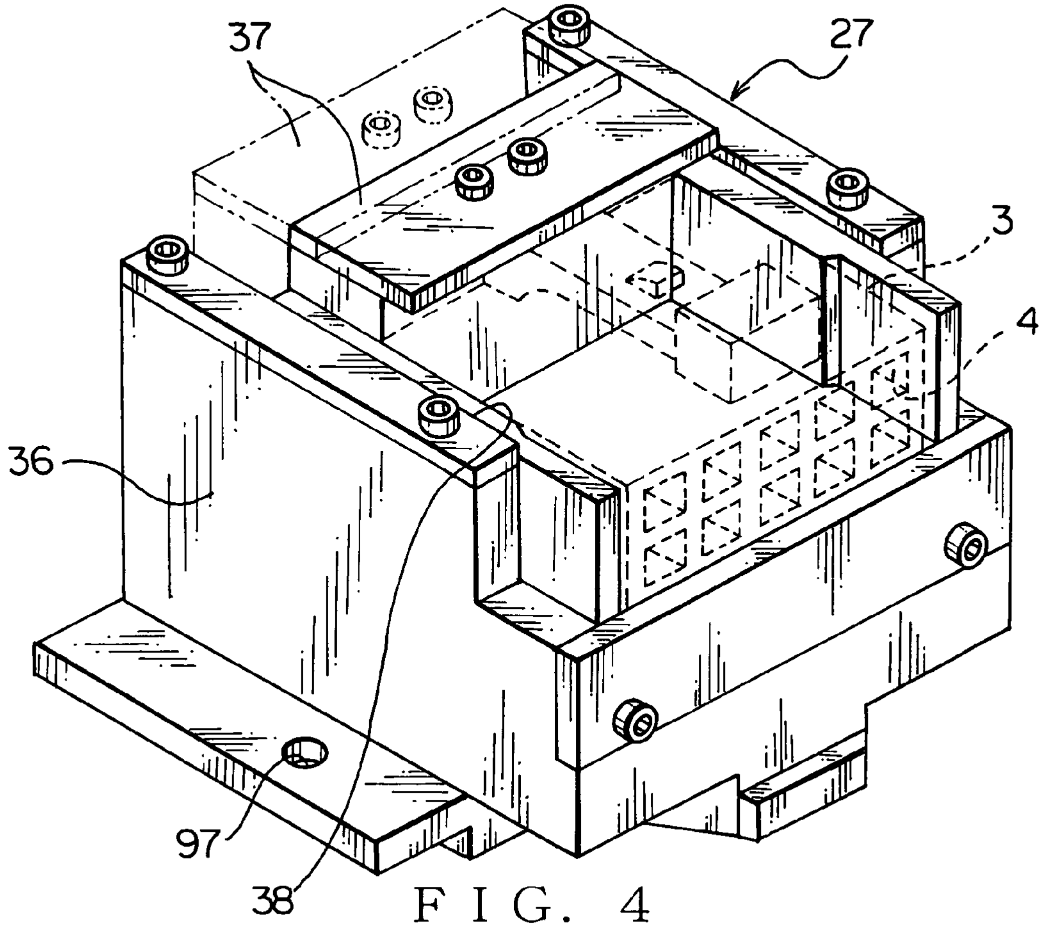
FIG. 4 is a perspective view showing a holding jig of the terminal inserting apparatus in FIG. 1.
Figure 9:
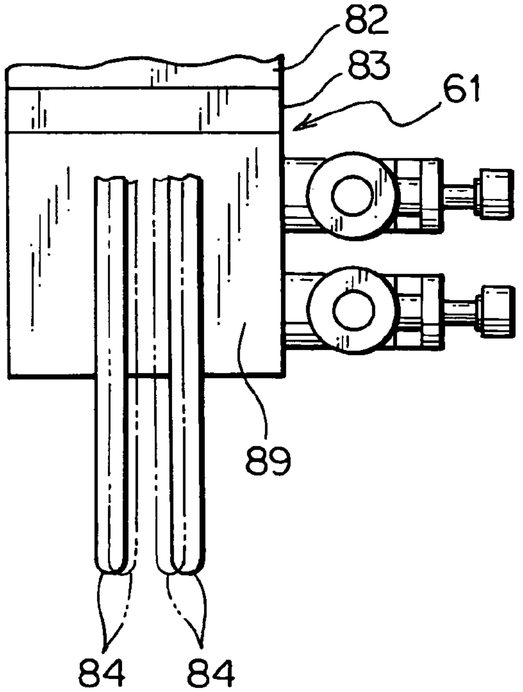
FIG. 9 is a front view showing a wire chuck of the terminal inserting apparatus in FIG. 1.

The holding jig 27 has a rectangular-solid shape jig main body 36, a slide member 37 and a coil spring (not shown) for biasing, as shown in FIG. 4. The jig main body 36 has a cutout 38 following an outer shape of the slide member 37.

The slide member 37 is provided in the cutout 38. The slide member 37 is supported slidably in a direction of moving close to and apart from the wire holding unit 11 by the jig main body 36. As shown with a solid line in FIG. 4, when the slide member 37 moves close to the wire holding unit 11, the slide member 37 limits that the connector housing 3 comes out of the cutout following the outer shape of the connector housing 3 of the slide member 37 through an upper side thereof and falls out from the jig main body 36 by clamping the connector housing 3 in the jig main body 36.

As shown with an alternate long and two short dashes line in FIG. 4, when the slide member 37 moves apart from the wire holding unit 11, the slide member 37 allows that the connector housing 3 comes out of the cutout of the slide member 37, and falls out from the jig main body 36. In the specification, a condition shown with the solid line in FIG. 4 is called as condition of limiting falling-out, and a condition shown with the alternate long and two short dashes line in FIG. 4 is called as a condition of allowing falling-out. The coil spring biases the slide member 37 as the slide member 37 opens the cutout 38.

Thus, the holding jig 27 can move freely between the condition of allowing the connector housing 3 falling out of the holding jig 27 and the condition of limiting the connector housing 3 falling out of the holding jig 27.

The holding jig 27 is provided with a plurality of positioning holes 97, 98 for positioning. The positioning holes 97 are arranged at each side wall of the jig main body 36 of the holding jig 27 to pass through the side walls. The positioning holes 98 is recessed from a bottom wall of the jig main body 36 of the holding jig 27.

The holding jigs 27 as mentioned above preferably have the same outer shape even if the respective part numbers of the connector housings 3 to be held by the holding jig 27 are different. The holding jig 27, which holds the connector housing 3 having a different part number, has the cutout 38 mentioned above having a different shape.

The jig mount tray 92 mounts a plurality of holding jigs 27 to ride on the jig mount blocks 95 adjacent to each other. At the time, the positioning pin 96 penetrates into the positioning hole 97 of the holding jig 27. Since the attachment 94 extends straight, and the jig mount block 95 are arranged with a space along lengthwise of the attachment 94, a plurality of holding jigs 27 is arranged with a space along an arrow X (shown in FIG. 2) as a first direction, straight along a horizontal direction. The arrow X is in parallel to a direction, in which the plurality of holding jigs 27 is arranged, and the lengthwise of the attachment 94 of the jig mount tray 92.

The jig transporting unit 91 includes a moving table 99, a housing moving unit 100, a slide unit 101, the jig pushing-up unit 102 as a pulling-out unit, a second slide unit 103 and a gripping unit 104 as the gripping device.

The moving table 99 is provided between the attachment 94 of the jig mount tray 92 of the jig mounting unit 90 and the housing holding unit 12. The moving table 99 is movable along the arrow X by a motor 105, shown in FIG. 1, being mounted on the main body 10, a pair of pulleys provided rotatably at both end area in the direction of the arrow X of the main body, and a endless belt suspended between the pair of pulleys. The endless belt is fixed on the moving table 99. The moving table 99 is moved by the endless belt which is moved around the pair of pulleys by a rotating force of the motor 105.

The housing moving unit 100 includes a support table 106, a slide cylinder 107, a support block 108, an up/down cylinder 109, an up/down block 110, a chuck cylinder 111 and a pair of housing chucks 112. The support table 106 is provided and mounted on a top of the moving table 99.

The slide cylinder 107 has a cylinder body 113 and a rod 114 (shown in FIG. 12) telescopic (expanding/contracting) from the cylinder body 113. The cylinder body 113 is fixed on the support table 106 so that the rod 114 approaches the jig mounting unit 90. Lengthwise of the rod 114 and a telescopic direction of the rod 114 are perpendicular (intersecting) to the arrow X and along an arrow Y (shown FIGS. 1, 2) as a second direction parallel to a horizontal direction.

The support block 108 has a flat plate 115 and a vertical plate 116. The flat plate 115 is fixed on the rod 114 of the slide cylinder 107. The vertical plate 116 extends (stands) upwardly from the flat plate 115. The up/down cylinder 109 has a cylinder body 117 and a rod 118 telescopic from the cylinder body 117. The cylinder body 117 is fixed at a top end of the vertical plate 116 of the support block 108 to make the expanding rod 118 go upwardly.

The up/down plate 110 is fixed at the rod 118 of the up/down cylinder 109. The chuck cylinder 111 includes a cylinder body 119 and a rod 120 projecting from the cylinder body 119. The cylinder body 119 is fixed at the up/down plate 110. The rod 120 projects in both directions of the arrow X from the cylinder body 119.

The pair of rods 120 expands and contracts about the cylinder 119 to approach and depart each other. The housing chucks 112 are fixed at each rod 120. The pair of housing chucks 112 clamps the connector housing 3 in the-housing supplier 93 therebetween by approaching each other.

In the housing moving unit 100, the chuck cylinder 111 positions above the housing supplier 93 by expanding the rod 118 of the up/down cylinder 109 and expanding the rod 114 of the slide cylinder 107. When the rods 120 of the chuck cylinder 111 are apart from each other in the housing moving unit 100, the chuck cylinder 111 approaches the housing supplier 93 by contracting the rod 118 of the up/down cylinder 109. Thereby, the rods 120 of the chuck cylinder 111 approach each other and the connector housing 3 in the housing supplier 93 is clamped (chucked) between the housing chuck 112.

The housing moving unit 100 pulls up the chucked connector housing 3 from the housing supplier 93 by expanding the rod 118 of the up/down cylinder 109. After the rod 114 of the slide cylinder 107 is contracted, the housing moving unit 100 inserts the chucked connector housing 3 into the cutout 38 of the holding jig 27 mounted in the jig mounting unit 90 by contracting the rod 118 of the up/down cylinder 109. After departing the rods 120 of the chuck cylinder 111 from each other, the housing moving unit 100 separates the chuck cylinder 111 from the holding jig 27 by expanding the rod 118 of the up/down cylinder 119. Thus, the housing moving unit 100 transports the connector housing 3 from the housing supplier 93 to the holding jig 27.

The slide unit 101 is arranged together with the housing moving unit 100 along the arrow X as shown in FIG. 2. The slide unit 101 includes a slide cylinder 121 and a slide plate 122 as shown in FIG. 1. The slide cylinder 121 includes a cylinder body 123 and a rod 124 telescopic from the cylinder body 123 (shown in FIG. 19). The cylinder body 123 is fixed on the moving table 99 so that the expanding rod 124 approaches the jig mounting unit 90. Lengthwise of the rod 124 and a telescopic direction of the rod 124 are perpendicular to the arrow X and along the arrow Y as the second direction parallel to the horizontal direction. The slide plate 122 is fixed on the rod 124 of the slide cylinder 121. Thereby, the slide plate 122 is movable along the arrows X, Y.

Figure 3:
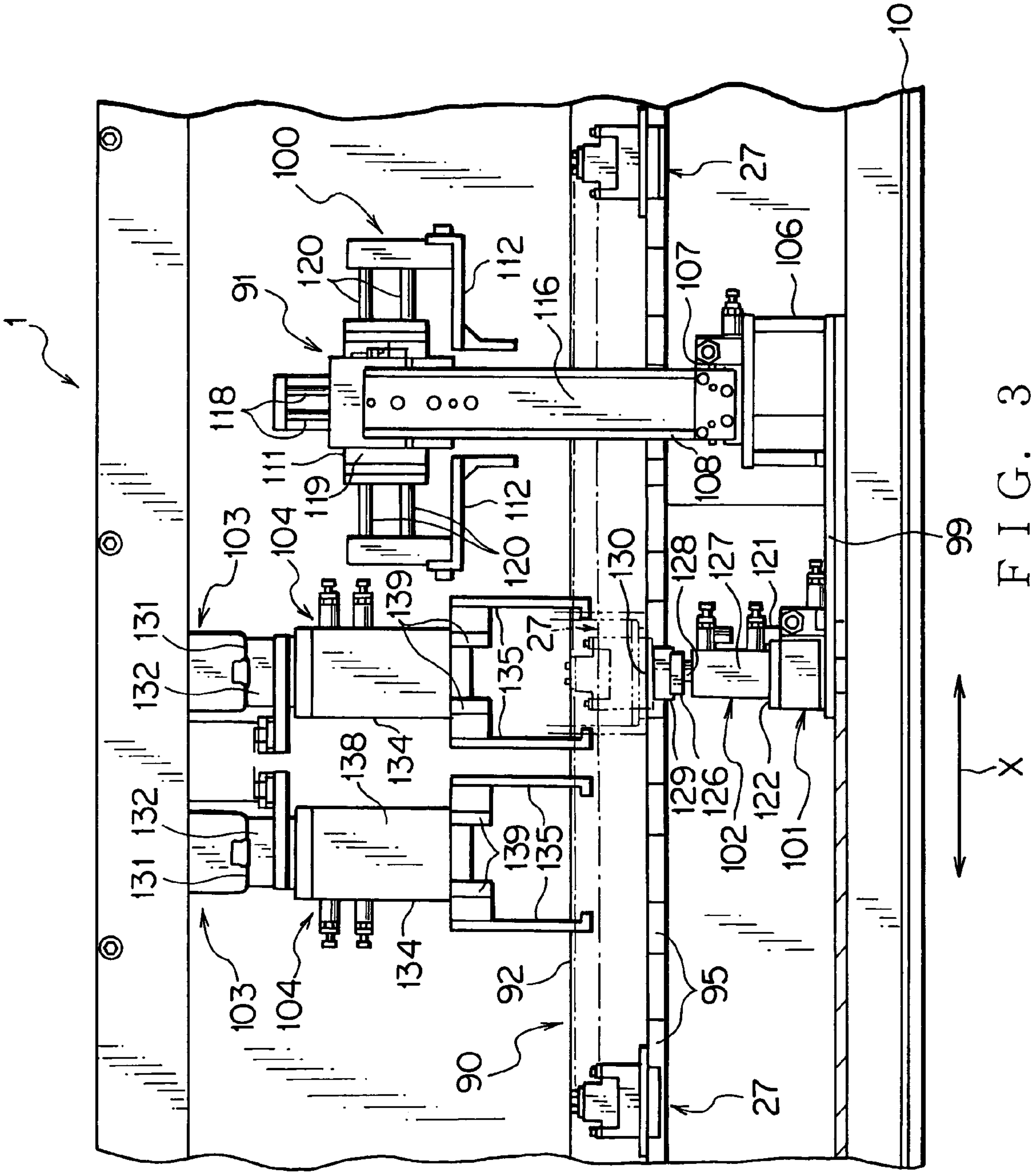
FIG. 3 is a front view showing a jig transporting unit of the terminal inserting apparatus in FIG. 1.

The jig pushing-up unit 102 has an up/down cylinder 125 and a pushing-up tray 126 as shown in FIG. 3. The up/down cylinder 125 is provided on the slide plate 122. Thereby, the jig pushing-up unit 102 is arranged together with the housing moving unit 100 along the arrow X as shown in FIG. 2. The up/down cylinder 125 has a cylinder body 127 and a rod 128 telescopic from the cylinder body 127. The cylinder body 127 is fixed on the aforesaid slide plate 122 so that the expanding rod 128 goes upwardly.

The pushing-up tray 126 is fixed on the rod 128 of the up/down cylinder. The pushing-up tray 126 includes a tray body 129 having a flat top surface along a horizontal direction, and a positioning pin 130 projecting from the tray body 129. When the rod 124 of the slide cylinder 121 expands and the rod 128 of the up/down cylinder 125 expands, the pushing-up tray 126 penetrates between the jig mount blocks 95, adjacent to each other, of the jig mounting unit 90, and the holding jig 27 overlaps with the tray body 129 of the pushing-up tray 126.

When the rod 128 of the up/down cylinder 125 contracts and the rod 124 of the slide cylinder 121 expands, the pushing-up tray 126 of the jig pushing-up unit 102 penetrates between the jig mount blocks 95 adjacent to each other. Thereafter, the rod 128 of the up/down cylinder 125 expands, so that the holding jig 27 overlaps with the tray body 129 of the pushing-up tray 126 and furthermore the tray body 129 of the pushing-up tray 126 is pushed up the holding jig 27. Thereby, the positioning pin 96 of the jig mounting unit 90 moves out from the positioning hole 97 of the holding jig 27, and the positioning pin 130 of the pushing-up tray 126 penetrates into the positioning hole 98 of the holding jig 27.

Thereafter, by contracting the rod 124 of the slide cylinder 121, the jig pushing-up unit 102 pulls out the holding jig 27 from the jig mounting unit 90 toward the housing holding unit 12. Thus, the jig pushing-up unit 102 is provided movable in both directions of the arrow X and the arrow Y. The jig pushing-up unit 102 penetrates through the jig mount tray 92 of the jig mounting unit 90, and pushes up one holding jig 27 of the plurality of holding jigs 27 mounted in the jig mount tray 92, and pulls out the one holding jig 27 from the jig mount tray 92.

The second slide unit 103 includes a slide cylinder 131 as shown in FIG. 1, 3. The slide cylinder 131 has a cylinder body 132 provided slidably along the arrow Y at a top end of the vertical wall 18 of the main body 10.

The gripping unit 104 includes an up/down cylinder 133, a chuck cylinder 134 and a pair of jig chucks 135 as shown in FIG. 1, 3. The up/down cylinder 133 has a cylinder body 136 and a rod 137 telescopic from the cylinder body 136. The cylinder body 136 is arranged so that the telescopic rod 137 moves upwardly. The rod 137 is fixed at the cylinder body 132 of the slide cylinder 131.

The chuck cylinder 134 includes a cylinder body 138 and a pair of rods 139. The pair of rods 139 project downwardly from the cylinder body 138 with an interval along the arrow X. The rods 139 approach and depart to each other. The pair of jig chucks 135 is respectively fixed on the rod 139. When the pair of jig chucks 135 approach to each other, the jig chucks 135 clamp the holding jig 27 to be held on the pushing-up tray 126 or in the housing holding unit 12 therebetween.

The gripping unit 104 as structured above is provided movably along the arrow Y as the second direction. As describing later, the gripping unit 104 approaches the one holding jig 27 to be pushed up on the pushing-up tray 126 by the jig pushing-up unit 102, and clamps the one holding jig 27 with the jig chuck 135. The gripping unit 104 transports the clamped holding jig 27 to the housing holding unit 12.

As describing later, the gripping unit 104 as structured above approaches the one holding jig 27 in which the connector housing 3 held in the housing holding unit 12 receives all required terminals 6, and grips the one holding jig 27 with the jig chuck 135. The gripping unit 104 transports the clamped holding jig 27 to the pushing-up tray 126 of the jig pushing-up unit 102.

A pair of the second slide units 103 as structured above and a pair of gripping units 104 are provided. The pair of gripping units 104 is arranged along the arrow X. One gripping unit

104, positioned at right side in FIG. 3, of the pair of gripping units 104 transports the holding jig 27 from the pushing-up tray 126 of the jig pushing-up unit 102 to the housing holding unit 12. The other gripping unit 104 transports the holding jig 27 from the housing holding unit 12 to the jig pushing-up tray 126 of the jig pushing-up unit 102.

When the gripping unit 104 transports the holding jig 27 from the pushing-up tray 126 of the jig pushing-up unit 102 to the housing holding unit 12, the rod 137 of the up/down cylinder 133 is contracted, and the rod 137 of the up/down cylinder 133 is expanded, in a condition that the pushing-up tray 126 of the jig pushing-up unit 102 is positioned under the aforesaid one gripping unit 104. In this moment, the rods 139 of the chuck cylinder 134 must be departed from each other. Thereafter, by approaching the rods 139 of the chuck cylinder 134 to each other, the holding jig 27 is clamped (chucked) between the pair of jig chucks 135.

After that, the gripping unit 104 contracts the rod 137 of the up/down cylinder 133, and moves the cylinder body 132 of the slide cylinder 131 along the arrow Y, and places the chucked holding jig 27 above the housing holding unit 12. Thereafter, the rod 137 of the up/down cylinder 133 expands to mount the chucked holding jig 27 on the housing holding unit 12 and the rods 139 of the chuck cylinder 134 are departed from each other. After that, the rod 137 of the up/down cylinder 133 is contracted. Thus, the gripping unit 104 transports the holding jig 27 from the jig pushing-up unit 102 to the housing holding unit 12.

The gripping unit 104 acts oppositely to an operation to transport the holding jig 27 from the pushing-up tray 126 of the jig pushing-up unit 102 to the housing holding unit 12. Thereby, the gripping unit 104 transports the holding jig 27 from the housing holding unit 12 to the pushing-up tray 126 of the jig pushing-up unit 102.

Figure 5:
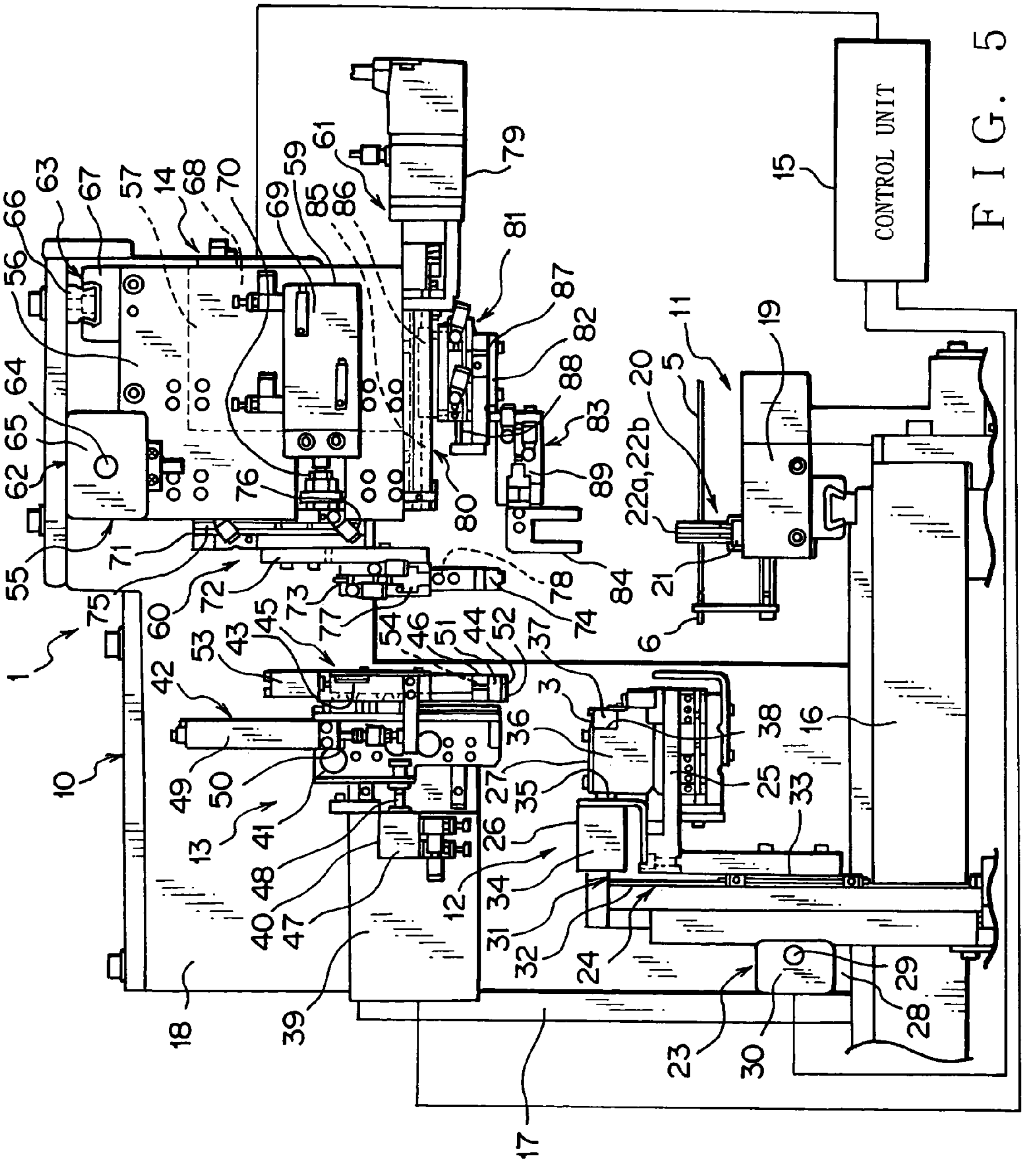
FIG. 5 is a side view showing a structure of a part of the terminal inserting apparatus in FIG. 1.
Figure 6:
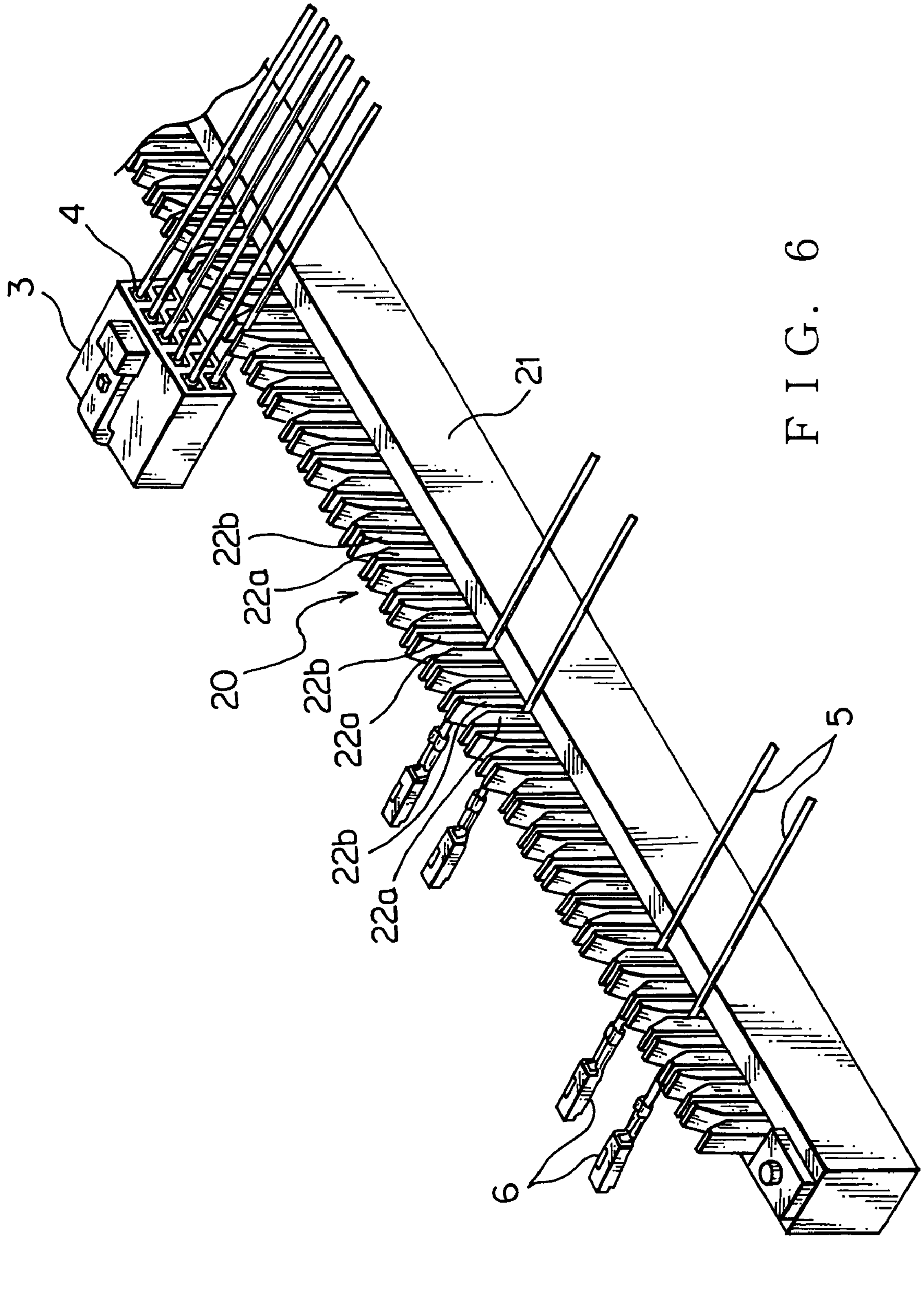
FIG. 6 is a perspective view showing a bar of the terminal inserting apparatus in FIG. 1.

The wire holding unit 11 includes a unit body 19, a bar 20 attachable to the unit body 19, as shown in FIG. 5, 6. The unit body 19 is fixed on the table 16 of the main body 10. The unit body 19 is formed into a bar(rod)-shape which lengthwise is in parallel to the horizontal direction. The lengthwise of the unit body 19 is in parallel to a direction from a deep side to a near side, or from the near side to the deep side in FIG. 5.

The bar 20 has a bar body 21 and a plurality of pairs of clamps 22*a*, 22*b* projecting from the bar body 21. The bar body 21 is attachable to the unit body 19. The bar body 21 is fixed on the unit body 19, to arrange a lengthwise thereof in parallel to a lengthwise of the unit body 19.

The clamps 22*a*, 22*b* are supported by the bar body 21 to approach and depart each other freely. The clamps 22*a*, 22*b* are forces to approach each other. The clamps 22*a*, 22*b* are provided adjacent to each other along the lengthwise of the bar body 21. The plurality of pairs of clamps 22*a*, 22*b* is arranged along the lengthwise of the bar body 21. The clamps 22*a*, 22*b* clamp the electric wire 5 between each other.

The wire holding unit 11 as structured above holds the electric wire 5 connected with the terminal 6 by clamping the electric wire 5, which is connected with the terminal 6 before being inserted into the terminal receiving chamber 4 of the connector housing 3, between clamps 22*a*, 22*b*. The wire holding unit 11 holds also the electric wire 5 connected with the terminal 6, that is the connector housing 3, by clamping the electric wire 5, which is connected with the terminal 6 inserted into the terminal receiving chamber 4 of the connector housing 3, between clamps 22*a*, 22*b*.

The housing holding unit 12 includes a horizontally moving unit 23, a up/down unit 24, a support table 25, a connector-fixing cylinder 26 for fixing the connector and the holding jig 27 for holding the housing, as shown in FIG. 5.

The horizontal moving unit 23 has a motor (not shown) and a ball screw 28. The motor is mounted on the main body 10. The ball screw 28 has a screw shaft 29 and a nut 30. The screw shaft 29 is supported rotatably at the main body 10 to make a lengthwise of the screw shaft 29 in parallel to the horizontal direction. The screw shaft 29 is rotated by the motor around an axis of the screw shaft 29.

The lengthwise of the screw shaft 29 is in parallel to the direction from a deep side to a near side, or from the near side to the deep side in FIG. 5. The nut 30 is engaged with the screw shaft 29. The up/down unit 24, that is the holding jig 27, is connected with the nut 30. The horizontal moving unit 23 moves the nut 30, that is the holding jig 27, along the lengthwise of the screw shaft 29 by rotating force of the motor.

The up/down unit 24 has a motor (not shown) and a ball screw 31. The motor is mounted the nut 30. The ball screw 31 has a screw shaft 32 and a nut 33. The screw shaft 32 is supported rotatably by the nut 30 to make a lengthwise of the screw shaft 32 in parallel to the vertical direction. The screw shaft 32 is rotated by the motor around an axis of the screw shaft 32. The nut 33 is engaged with the screw shaft 31. The support table 25, that is the holding jig 27 mounted on the support table 25, is fixed on the nut 33. The up/down unit 24 moves the nut 33, that is the holding jig 27 held on the support table 25, along the lengthwise of the screw shaft 32 by rotating force of the motor. Thus, the up/down unit 24 supports the holding jig 27, held on the support table 25, movable up/down.

The support table 25 is fixed on the nut 33 of the up/down unit 24. The support table 25 extends from the nut 33 of the up/down table 24 toward the wire holding unit 11 along the horizontal direction.

The connector-fixing cylinder 26 includes a cylinder body 34 connected with the support table 25 and a rod 35 telescopic from the cylinder body 34. The cylinder body 34 is fixed on the support table 25 so as to arrange the lengthwise of the rod 35 in parallel to the horizontal direction and make the rod 35 approach the wire holding unit 11 when the rod 35 expands. When the rod 35 expands, the rod 35 pushes a later-described slide member 37 of the holding jig 27 against the biasing force of the coil spring. When the rod 35 expands, the connector-fixing cylinder 26 maintains the holding jig 27 in the later-described condition of limiting falling-out.

When the rod 35 contracts, the connector-fixing cylinder 26 makes the rod 35 not press the slider member 37 of the holding jig 27. Thus, when the rod 35 contracts, the connector-fixing cylinder 26 maintains the holding jig 27 in the later-described a condition of allowing falling-out. The connector-fixing cylinder 26 is supported up/down freely together with the holding jig 27 by the up/down unit 24, and simultaneously moves the holding jig 27 between the condition of limiting falling-out and the condition of allowing falling-out.

When the terminal 6 is inserted into the terminal receiving chamber 4 of the connector housing 3, the aforesaid housing holding unit 12 positions the support table 25, that is the holding jig 27 mounted on the support table 25, at an upper side by the up/down unit 24. Also, when the terminal 6 is inserted into the terminal receiving chamber 4 of the connector housing 3, the aforesaid housing holding unit 12 maintains the holding jig 27 in the condition of limiting falling-out by the connector fixing cylinder,26 and holds the connector housing 3 in the holding jig 27.

When the all terminals 6 (the last terminal 6) are inserted into the terminal receiving chambers 4 of the connector housing 3, the aforesaid housing holding unit 12 moves the holding jig 27 to the condition of allowing falling-out. Finally, in a condition that the electric wire 5 connected with the terminal 6 inserted in the terminal receiving chamber 4 is gripped by a wire chuck unit 61, the aforesaid housing holding unit 12 moves the holding jig 27 down by the up/down unit 24. Then, the aforesaid housing holding unit 12 makes the connector housing 3 fall out from the holding jig 27.

The guide unit 13 includes a main plate 39, a front/rear cylinder 40, a support plate 41, an up/down cylinder 42, an up/down plate 43, a fixed guide plate 44, a guide open/close device 45 and a movable guide plate 46 as shown in FIG. 5. The main plate 39 is mounted on a top end at a side apart from the table 16 of the vertical column 17. The main plate 39 extends from the vertical column 17 toward the wire holding unit 11.

The front/rear cylinder 40 has a cylinder body 47 and a rod 48 telescopic from the cylinder body 47. The cylinder body 47 is mounted on the main plate 39 so as to arrange a lengthwise of the rod 48 in parallel to the horizontal direction and make the rod 48 approach the wire holding unit 11 when the rod 48 expands. When the rod 48 expands, the front/rear cylinder 40 makes the support plate 41, that is the guide plates 44, 46, apart from the holding jig 27 and approach the wire holding unit 11. When the rod 48 contracts, the front/rear cylinder 40 makes the support plate 41, that is the guide plates 44, 46, approach the holding jigs 27.

The support plate 41 is mounted on the rod 48 of the frat/rear cylinder 40. The up/down cylinder 42 has a cylinder body 49 and a rod 50 telescopic from the cylinder body 49. The cylinder body 49 is mounted on the support plate 41 so as to arrange a lengthwise of the rod 50 in parallel to the vertical direction and make the rod 50 approach the housing holding unit 12 when the rod 50 expands.

When the rod 50 expands, the up/down cylinder 42 makes the up/down plate 43, that is the guide plates 44, 46, approach the holding jig 27. When the rod 50 contracts, the up/down cylinder 42 makes the up/down plate 43, that is the guide plates 44, 46, depart from the holding jig 27. Thus, the up/down cylinder 42 supports the up/down plate 43, that is the guide plates 44, 46, movably up/down.

The up/down plate 43 is mounted on the rod 50 of the up/down cylinder 42. The fixed guide plate 44 is fixed on the up/down plate 43. The fixed guide plate 44 is provided integrally with a vertical portion 51 extending along the vertical direction and a horizontal portion 52 extending from a bottom end of the vertical portion 51 in the horizontal direction.

The guide open/close device 45 has a cylinder body 53 and a rod telescopic from the cylinder body 53. The cylinder body 53 is mounted on the up/down plate 43 so as to arrange a lengthwise of the rod in parallel to the vertical direction and make the rod approach the housing holding unit 12 when the rod expands. When the rod expands, the guide open/close device 45 makes the movable guide plate 46 approach the holding jig 27. When the rod contracts, the guide open/close device 45 makes the movable guide plate 46 apart from the holding jig 27. Thus, the guide open/close device 45 supports the movable guide plate 46 movably up/down. Thereby, the movable guide plate 46 is movable between a position shown with solid lines in FIG. 7 and a position shown with an alternate long and two short dashes lines in FIG. 7.

The movable guide plate 46 is fixed on the rod of the guide open/close device 45. The movable guide plate 46 is supported movably along the vertical direction by the up/down plate 43. The movable guide plate 46 is formed into band-plate shape which lengthwise is along the vertical direction. The movable guide plate 46 is provided at a bottom end thereof with a guiding cutout 54. The guiding cutout 54 is formed that an opening becomes narrower gradually along the horizontal direction (the right/left direction in FIG. 5) in accordance with approaching the holding jig 27 to be equal to an opening of the terminal receiving chamber 4.

In the aforesaid guide unit 13, when the holding jig 27 of the housing holding unit 12 is positioned under the guide unit 13, the rod of the cylinder body 53 contracts, and the rod 48 of the front/rear cylinder 40 expands, and the rod 50 of the up/down cylinder 42 expands. Thereby, the guide plates 44, 46 overlap the opening of the terminal receiving chamber 4 of the connector housing 3 held in the holding jig 27, along the horizontal direction. Thereafter, the rod of the cylinder body 53 expands, and the guide unit 13 make a horizontal portion of the fixed guide plate 44 contact with the bottom portion of the movable guide plate 46.

A bottom area of the guiding cutout 54 is covered by the horizontal portion 52, and a plane shape of the guiding cutout 54 becomes equal to a plane shape of the opening of the terminal receiving chamber 4. The rod 48 of the front/rear cylinder 40 contracts, and the guide plates 44, 46 are made contact tightly with the connector housing 3 held in the holding jig 27. Thereby, the guiding cutout 54 communicates with the terminal receiving chamber 4, in which the terminal 6 is inserted. Therefore, by inserting the terminal 6 connected with the electric wire 5 into the guiding cutout 54, the terminal 6 is guided into the terminal receiving chamber 4 of the connector housing 3.

The inserting unit 14 includes a horizontal moving unit 55, a horizontal moving plate 56, an up/down cylinder 57, an up/down plate 58 (shown in FIG. 30), an inserting cylinder 59, a front chuck unit 60 and a wire chuck unit 61, as shown in FIG. 5.

The horizontal moving unit 55 has a motor (not shown), a ball screw 62 and a linear guide 63. The motor is mounted on the main body 10. The ball screw 62 has a screw shaft 64 and a nut 65. The ball shaft 64 is supported rotatably at a top end of the vertical wall 18 of the main body 10 to arrange a lengthwise of the ball shaft 64 in parallel to the horizontal direction. The screw shaft 64 is rotated around its axis by the motor. The lengthwise of the screw shaft 64 is in parallel to the direction from a deep side to a near side, or from the near side to the deep side in FIG. 5. The nut 65 is engaged with the screw shaft 64. The horizontal moving plate 56, that is the front chuck unit 60 and the wire chuck unit 61, is connected with the nut 61.

The linear guide 63 has a rail 66 and a slider 67. The rail 66 is fixed on the vertical wall 18 to arrange a lengthwise of the rail 66 in parallel to the aforesaid screw shaft 64. The slider 67 is mounted on the rail 66 slidably along the lengthwise of the rail 66. The aforesaid horizontal moving plate 56, that is the front chuck unit 60 and the wire chuck unit 61, is mounted on the slider 67.

The horizontal moving unit 55 moves the nut 65 and the horizontal moving plate 56, that is the front chuck unit 60 and the wire chuck unit 61, along the lengthwise of the screw shaft 64 by rotating force of the motor.

The horizontal moving plate 56 is fixed both on the aforesaid nut 65 and the slider 67. The horizontal moving plate 56 extends from the nut 65 and the slider 67 downwardly.

The up/down cylinder 57 has a cylinder body 68 mounted on the horizontal moving plate 56 and a rod telescopic from the cylinder body 68. The up/down cylinder 57 moves the up/down plate 58 up and down by expanding and contracting the rod.

The up/down plate 58 is supported movably up/down, and in a direction of approaching to and departing from the housing holding unit 12 horizontally along the horizontal moving plate 56 by the horizontal moving plate 56.

The inserting cylinder 59 has a cylinder body 69 mounted on the horizontal moving plate 56 and a rod 70 telescopic from the cylinder body 69. The up/down plate 58 is fixed on the rod 70. When the rod 70 expands, the inserting cylinder 59 makes the up/down plate 58, that is the front chuck unit 60 and the wire chuck unit 61, approach to the housing holding unit 12. When the cylinder body 70 contracts, the inserting cylinder 59 makes the up/down plate 58, that is the front chuck unit 60 and the wire chuck unit 61, depart from the housing holding unit 12. Thus, the inserting cylinder 5.9 makes the up/down plate 58, that is the front chuck unit 60 and the wire chuck unit 61, approach to and depart from the housing holding unit 12.

The front chuck unit 60 includes an up/down cylinder 71, a support plate 72, a chuck cylinder 73 and a pair of front chucks 74.

Figure 30:
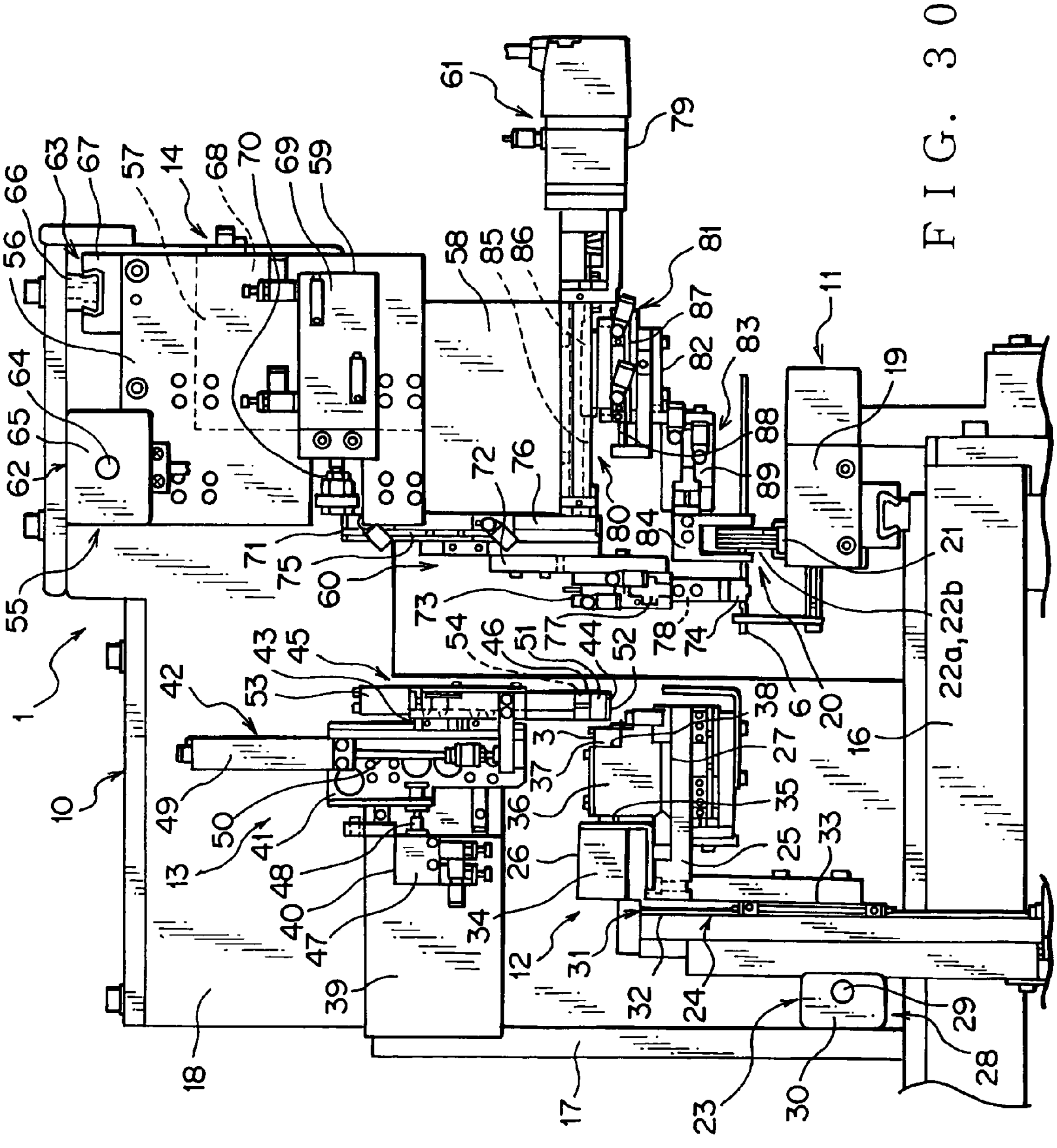
FIG. 30 is a side view showing a condition that a guide plate moves down and the chuck unit chucks an electric wire and the terminal held by the bar in the condition shown in FIG. 29.

The up/down cylinder 71 has a cylinder body 75 and a rod 76 telescopic from the cylinder body 75, as shown in FIG. 30. The cylinder body 75 is fixed at an end surface, closer to the housing holding unit 12, of the up/down plate 58. When the rod 76 expands from the cylinder body 75, the rod 76 moves downwardly.

Figure 8:
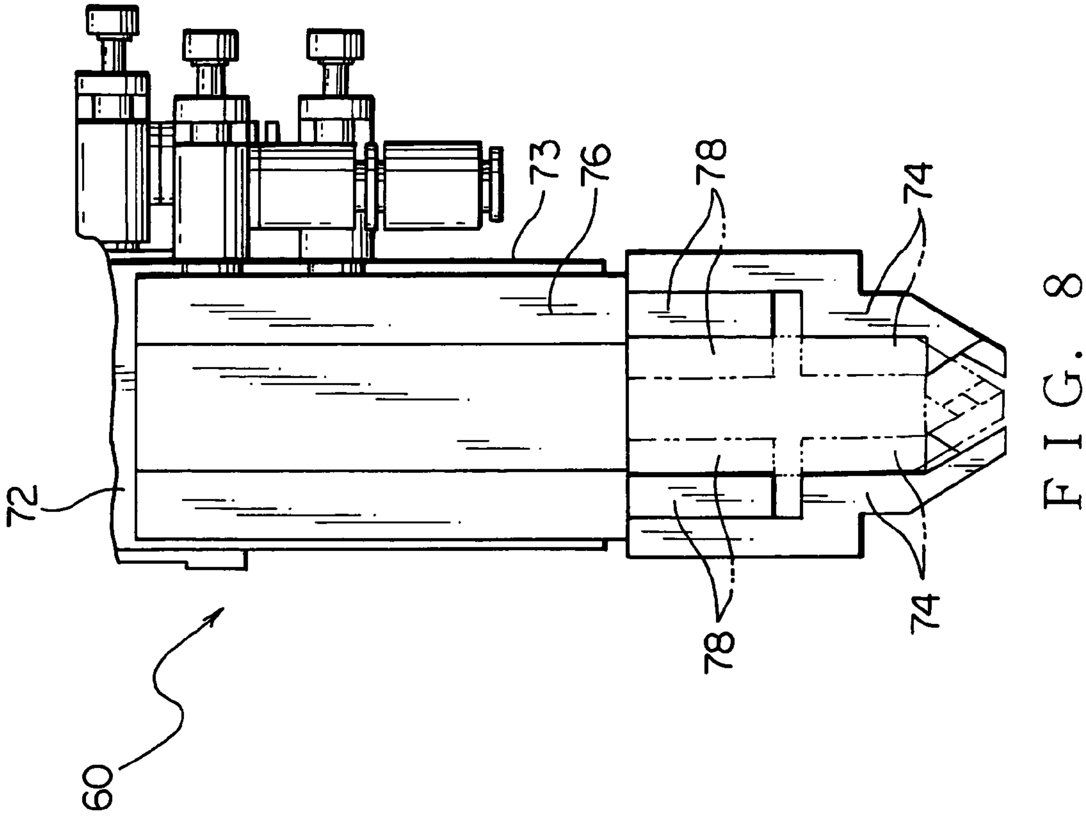
FIG. 8 is a front view showing a front chuck of the terminal inserting apparatus in FIG. 1.
Figure 7:
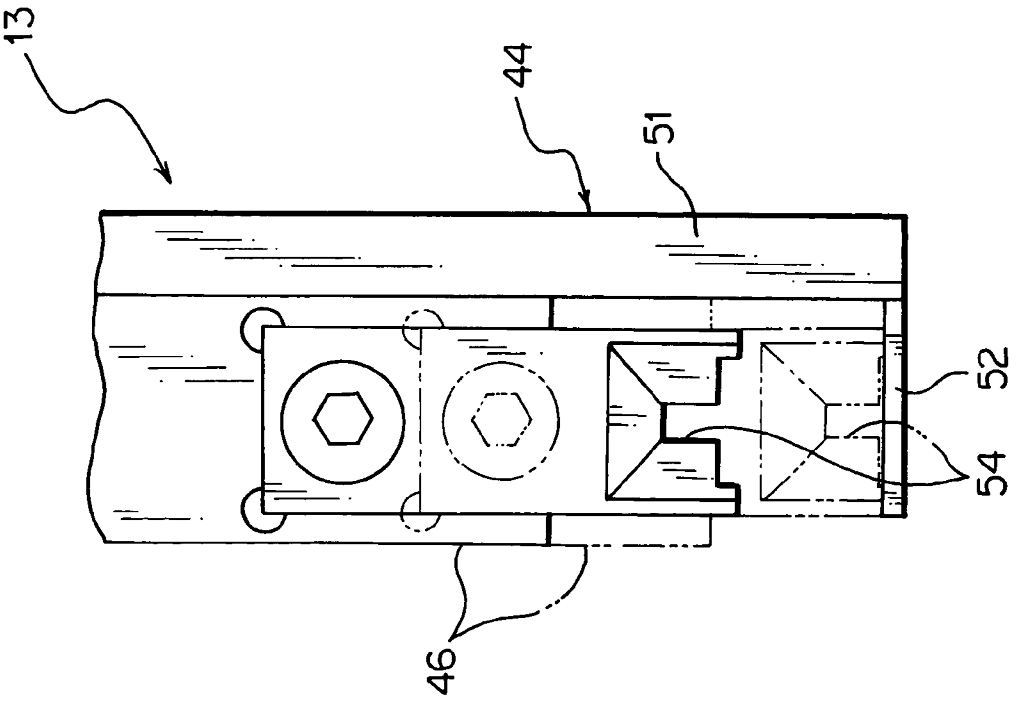
FIG. 7 is a front view showing a guide plate of a guide unit of the terminal inserting apparatus in FIG. 1.
Figure 10:
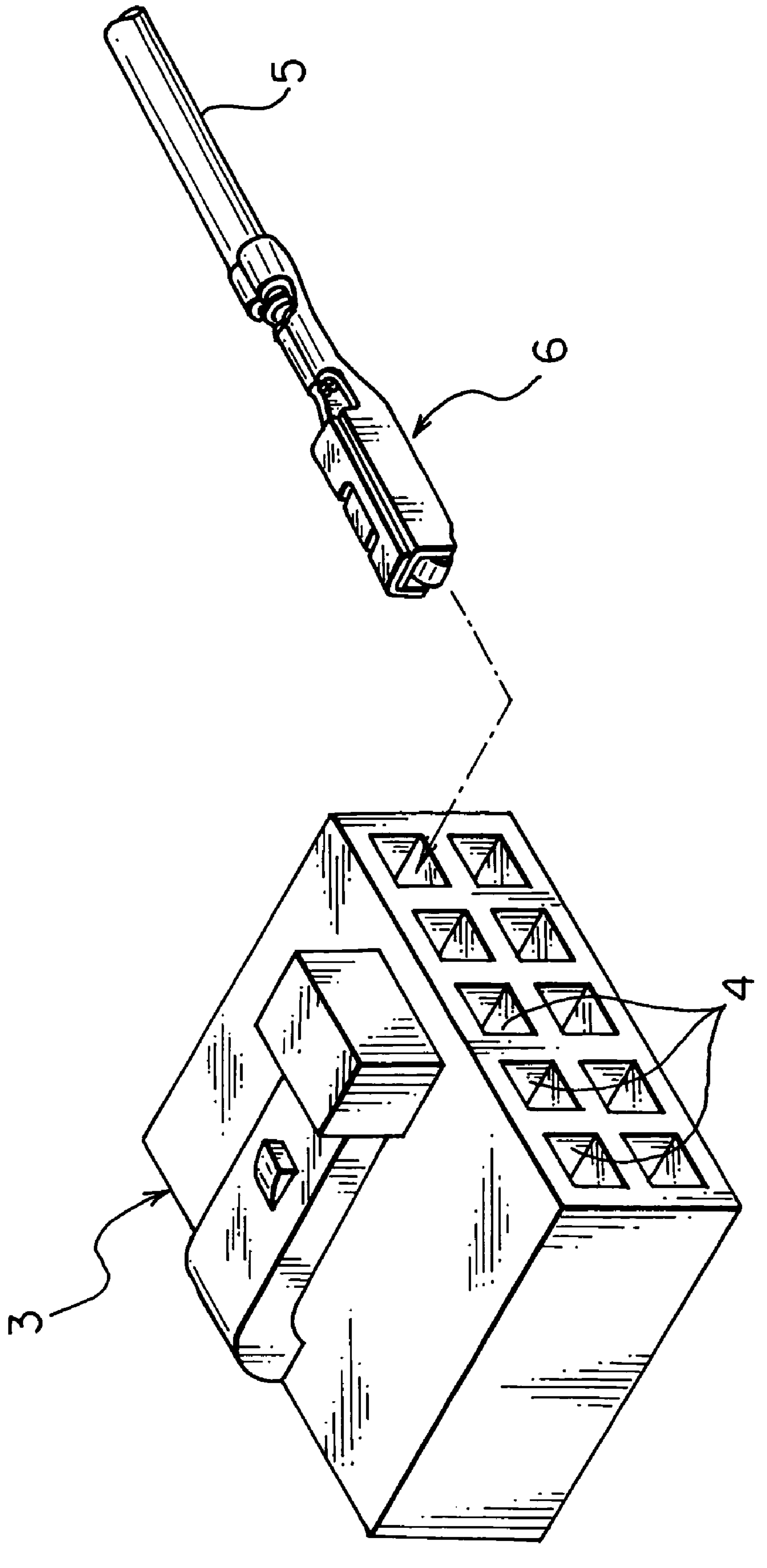
FIG. 10 is a perspective view showing a connector housing, into which a terminal is inserted, in the terminal inserting apparatus in FIG. 1.

The support plate 72 is fixed on the rod 76 of the up/down cylinder 71 to arrange both surfaces of the support plate 72 along the vertical direction. The chuck cylinder 73 has a cylinder body 77 mounted on the support plate 72 and a pair of rods 78 projecting from the cylinder body 77, as shown in FIG. 8. The rods 78, projecting downwardly from the cylinder 77, are arranged with a interval to each other in a direction from this side to a deep side or from the deep side to this side in FIG. 5.

The pair of rods 78 move between a position shown with a solid line in FIG. 8 and a position shown with an alternate long and two short dashes line in FIG. 8 to approach to and depart from each other. The front chucks 74 are fixed respectively on the rods 78. The pair of front chucks 74 clamps the electric wire 5 therebetween by approaching to each other.

The wire chuck unit 61 includes an inserting motor 79, a ball screw 80, a pull-check cylinder 81, a chuck support plate 82, a chuck cylinder 83 and a pair of wire chucks 84, as shown in FIG. 5.

The inserting motor 79 is mounted at a bottom end of the up/down plate 58. The ball screw 80 has a screw shaft 85 and a nut 86. The ball shaft 85 is supported rotatably at the bottom end of the up/down plate 58 to arrange a lengthwise of the ball shaft 85 in parallel to the horizontal direction and a right/left direction in FIG. 5. The screw shaft 85 is rotated around its axis by the inserting motor 79. The nut 86 is engaged with the screw shaft 85. The cylinder body 87 of the pull-check cylinder 81 is fixed with the nut 86. The inserting motor 79 moves the wire chuck 84 to approach to and depart from the connector housing 3 held in the holding jig 27 of the housing holding unit 12.

The pull-check cylinder 81 includes a cylinder body 87 and a rod 88 telescopic from the cylinder body 87. The cylinder body 87 is mounted on the nut 86. The cylinder body 87 is mounted on the nut 86 so as to arranged lengthwise of the rod 88 horizontally along a right/left direction in FIG. 5 and approach to the housing holding unit 12 when the rod 88 expands.

The chuck support plate 82 is fixed on the rod 88 of the pull-check cylinder 81. When the rod 88 of the pull-check cylinder 81 expands and contracts against the cylinder body 87, the chuck support plate 82 moves horizontally to approach to and depart from the housing holding unit 12.

The chuck cylinder 83 has a cylinder body 89 mounted on the chuck support plate 82 and a pair of rods (not shown) projecting from the cylinder body 89. The rods project from the cylinder body 89 toward the housing holding unit 12, and are arranged with an interval to each together along a direction from this side to deep side or from the deep side to this side. The pair of rods approaches to and depart from each other. The wire chucks 84 are mounted on the respective rods. Thereby, the wire chucks 84 move between positions shown with solid lines and positions shown with alternate long and two short dashes lines in FIG. 9. When the pair of wire chucks 84 approach to each other, the wire chucks 84 clamp the electric wire 5 connected with the terminal 6 therebetween.

When the up/down plate 58 is moved down by the up/down cylinder 57, and the rod 76 of the up/down cylinder 71 expands, the aforesaid inserting unit 14 makes the rods 78 of the chuck cylinder 73 of the front chuck unit 60 approach to each other so as to clamp the electric wire 5 held by the bar 20 between the pair of front chuck cylinders 74. By making the rods of the chuck cylinder 83 of the wire chuck unit 61 approach to each other, the inserting unit 14 clamps the electric wire 5 held by the bar 20 between the pair of wire chuck cylinders 84.

By pushing-up the up/down plate 58 by the up/down cylinder 57, the inserting unit 14 pulls out the terminal 6 and the electric wire 5 connected with the terminal 6 from the bar 20 of the wire holding unit 11. Thus, the inserting unit 14 removes the electric wire 5 held in the wire holding unit 11 from the wire holding unit 11.

By expanding the rod 70 of the inserting cylinder 59, the inserting unit 14 makes the up/down plate 58 approach to the holding jigs. The inserting unit 14 inserts the terminal 6 into the guiding cutout 54 of the guide unit 13. Thereby, the inserting unit 14 makes the pair of front chuck 74 of the front chuck unit 60 depart from each other, and moves up the front chuck 74 (depart it from the electric wire 5) by the up/down cylinder 71 of the front chuck unit 60. The inserting unit 14 makes the wire chuck unit 61 approach to the holding jig 27 by the inserting motor 79, and inserts the terminal 6 into the terminal receiving chamber 4 of the connector housing 3 held in the holding jig 27.

The connector housing 3 and the terminal 6 are fixed with each other by locking the aforesaid locking arm. Thereafter, the inserting unit 14 pulls the electric wire 5 by the pull-check cylinder 81. Then, the inserting unit 14 makes the wire chucks 84 depart from each other so as to remove the wire chuck unit 61 from the electric wire 5. The inserting unit 14 removes the electric wire 5 from the bar 20 and inserts the terminal 6 connected with the electric wire 5 into the terminal receiving chamber 4.

When the last terminal 6 is inserted into the terminal receiving chamber 4, the inserting unit 14 is maintained to clamp the electric wire 5 connected with the last terminal 6 inserted by the wire chuck unit 61. Thereafter, the up/down unit 24 of the housing holding unit 12 moves down the holding jig 27, so that the connector housing 3 is removed from the holding jig 27.

The inserting unit 14, which keeps to clamp the electric wire 5 connected with the last terminal 6 inserted by the wire chuck unit 61, press-fits the electric wire 5 between the clamps 22*a* and 22*b* of the bar 20 by actions of the inserting cylinder 59, the inserting motor 79, the up/down cylinder 57 and the horizontal moving unit 55. Thus, the inserting unit 14 transports the electric wire 5 connected with the last inserted terminal 6 to the wire holding unit 11, and the wire holding unit 11 holds the electric wire 5. As mentioned above, the housing holding unit 12 and the inserting unit 14 cooperate to mount one holding jig 27 of the plurality of holding jigs 27 mounted on the jig mounting unit 90, and to insert the terminal 6 into the terminal receiving chamber 4 of the connector housing 3 held in the one holding jig 27. The housing holding unit 12 and the inserting unit 14 corresponds to the inserting/mounting unit described in this specification.

The control unit 15 is a computer having a RAM, a ROM and a CPU. The control unit 15 connects with the jig transporting unit 91, the housing holding unit 12, the guide unit 13 and the inserting unit 14, and control actions of all these units for totally controlling the terminal inserting apparatus 1.

The control unit 15 remembers a position of the holding jig 27 corresponding to each part number of the connectors 2. The control unit 15 remembers an order of the terminal receiving chambers 4, into which the terminal 6 is inserted, of the connector housing 3 corresponding to each part number of the assembled connector 2, positions of terminals 6 to be inserted into each terminal receiving chamber 4 at the bar 20, and position of each terminal receiving chamber. Furthermore, the control unit 15 remembers positions of the clamps 22*a*, 22*b*, into which the electric wire 5 connected with the last inserted terminal 6 of the assembled connector 2 is press-fitted. The control unit 15 is connected with a well-known input device, such as a key board, and a well-known operating device, such as a switch.

For inserting the terminal 6 into each terminal receiving chamber 4 of the connector housing 3 by the aforesaid terminal inserting apparatus 1, firstly the part number of the connector to be assembled is inputted into the control unit 15. The plurality of holding jigs 27 is mounted on the jig mounting unit 90. The bar 20 according to the aforesaid part number is mounted on the unit body 19 of the wire holding unit 11.

Figure 11:
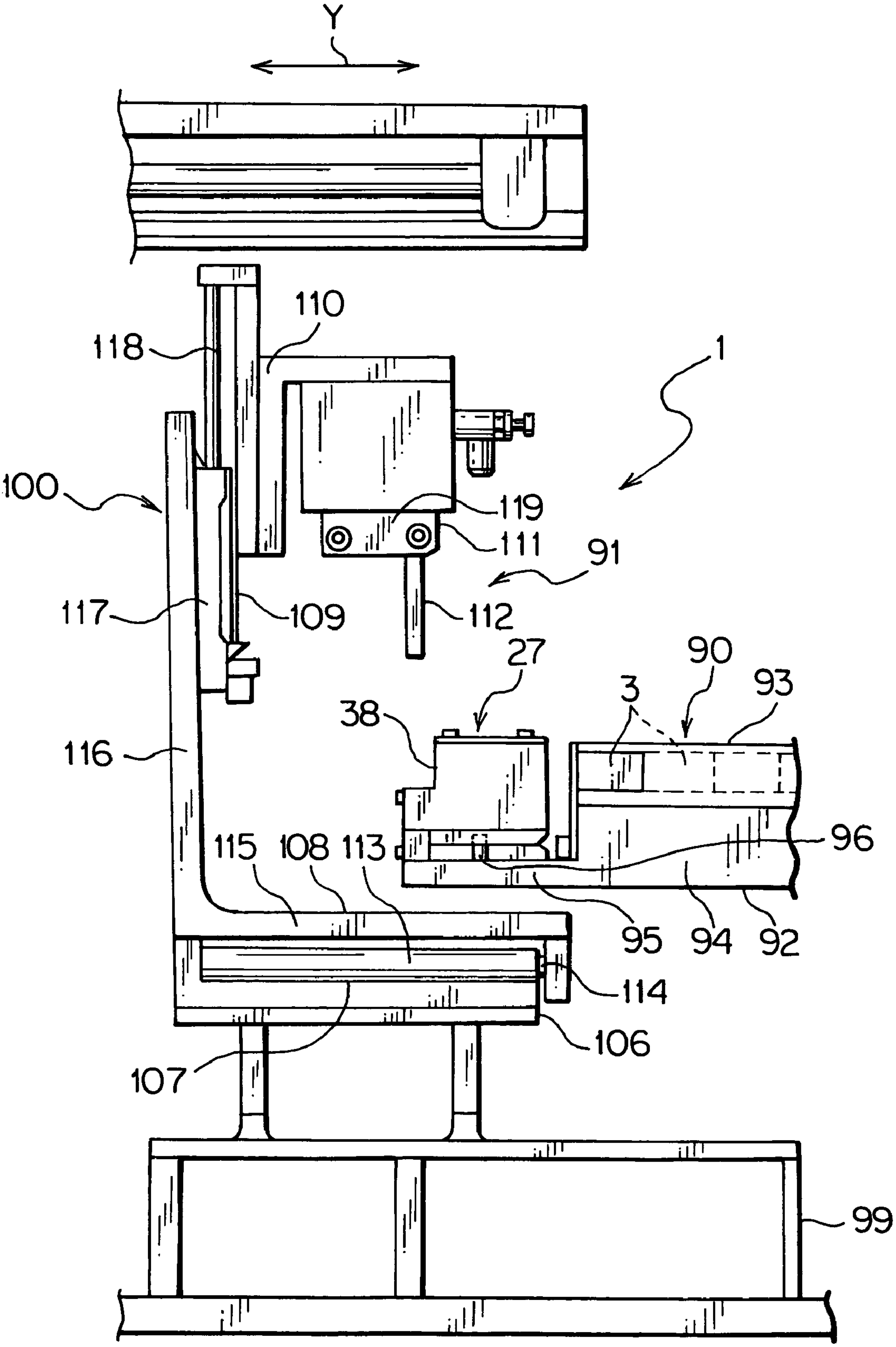
FIG. 11 is a side view showing a housing moving unit of the jig transporting unit of the terminal inserting apparatus in FIG. 1.
Figure 12:
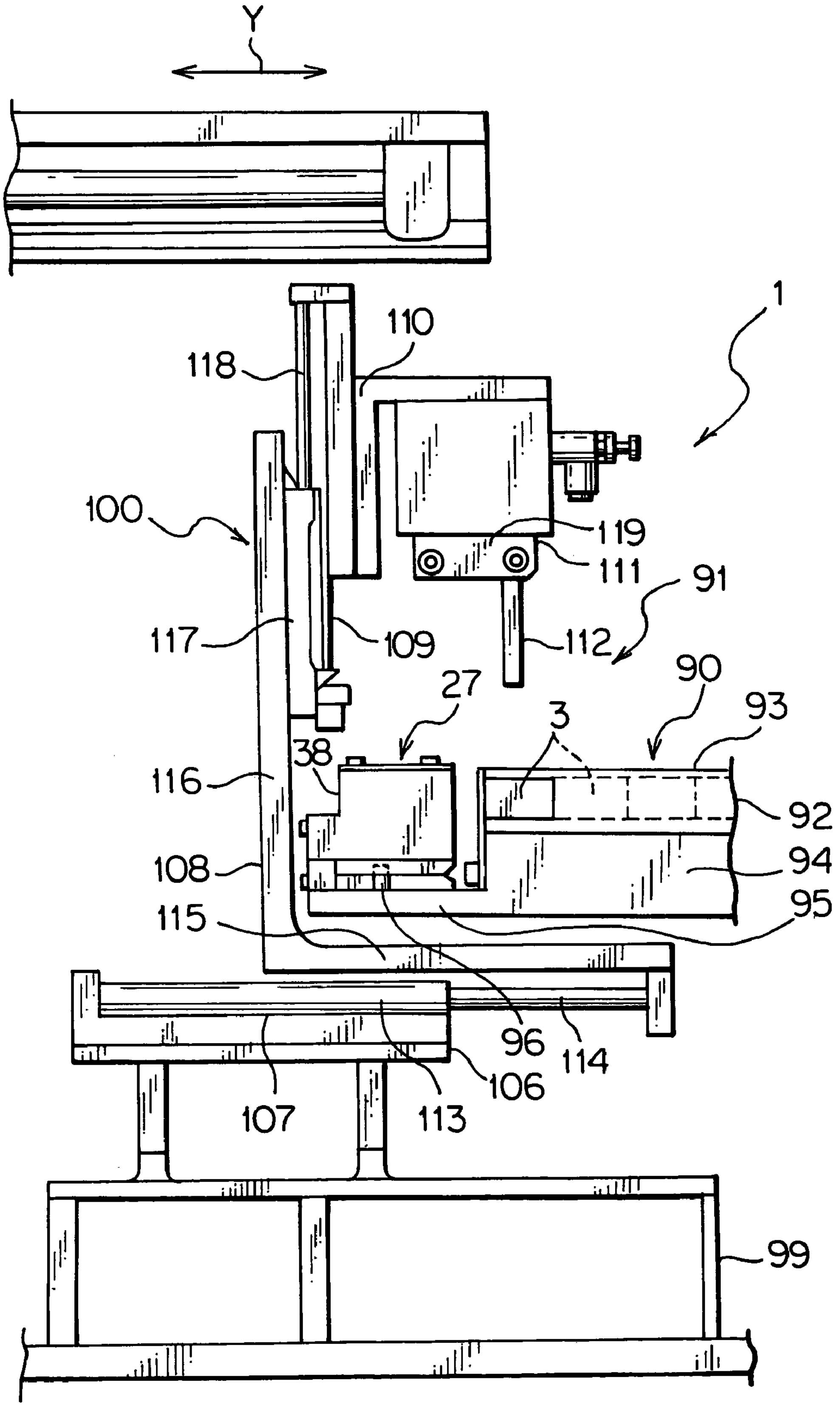
FIG. 12 is a side view showing a condition that a rod of a slide cylinder of the housing moving unit shown in FIG. 11 expands.
Figure 13:
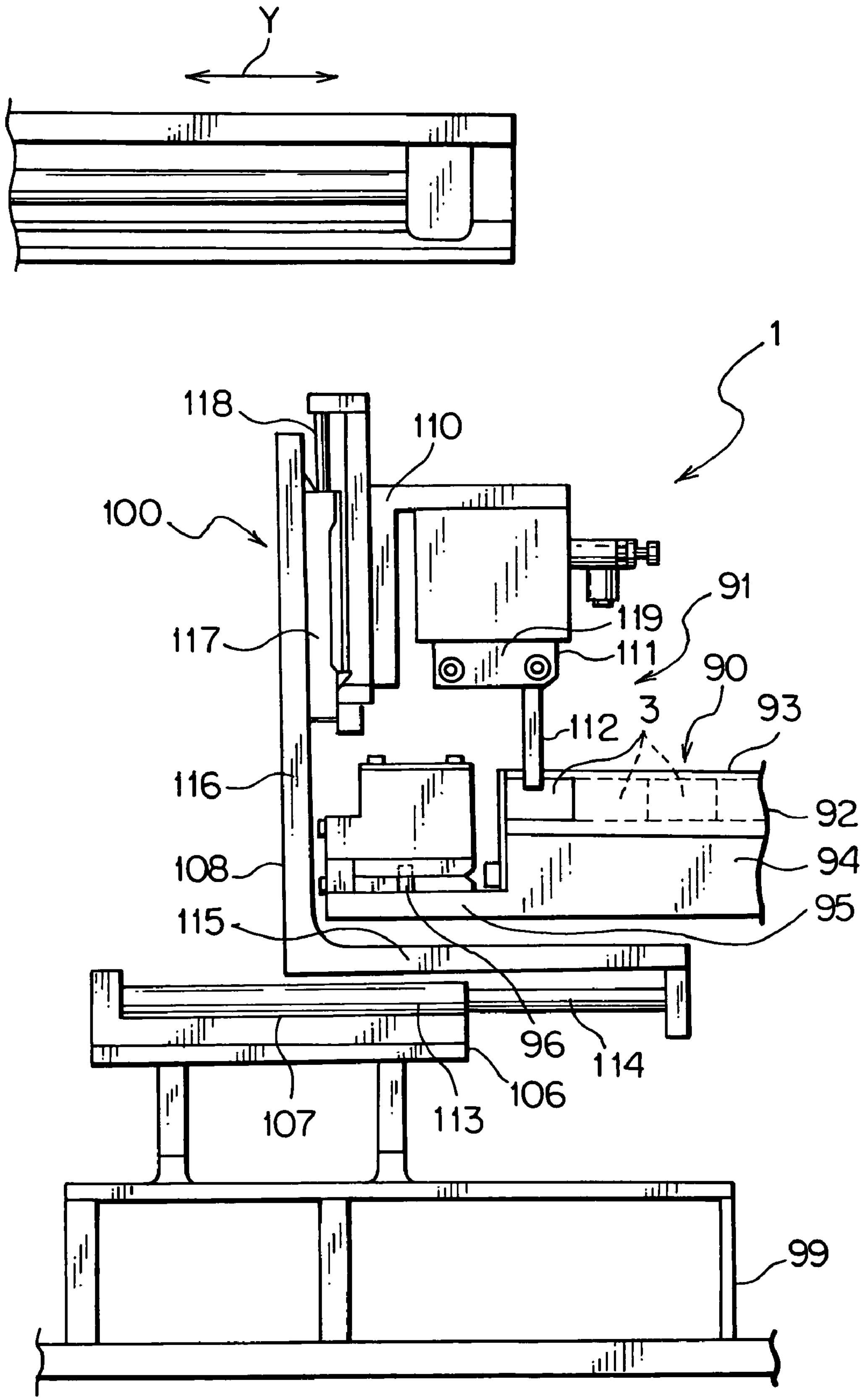
FIG. 13 is a side view showing a condition that a rod of an up/down cylinder of the housing moving unit shown in FIG. 12 contracts.

An command of starting operations is inputted to the control unit 15 by aforesaid operating device. Thereby, the control unit 15 moves the moving table 99 as shown in FIG. 11, and positions the chuck cylinder 111 of the housing moving unit 100 above the holding jig 27 corresponding to the part number of the connector to be assembled. At this time, the rod 118 of the up/down cylinder 109 expands and the pair of rods 120 of the chuck cylinder 111. The control unit 15 makes the rod 114 of the slide cylinder 107 of the housing moving unit 100 expand, as shown in FIG. 12.

Figure 14:
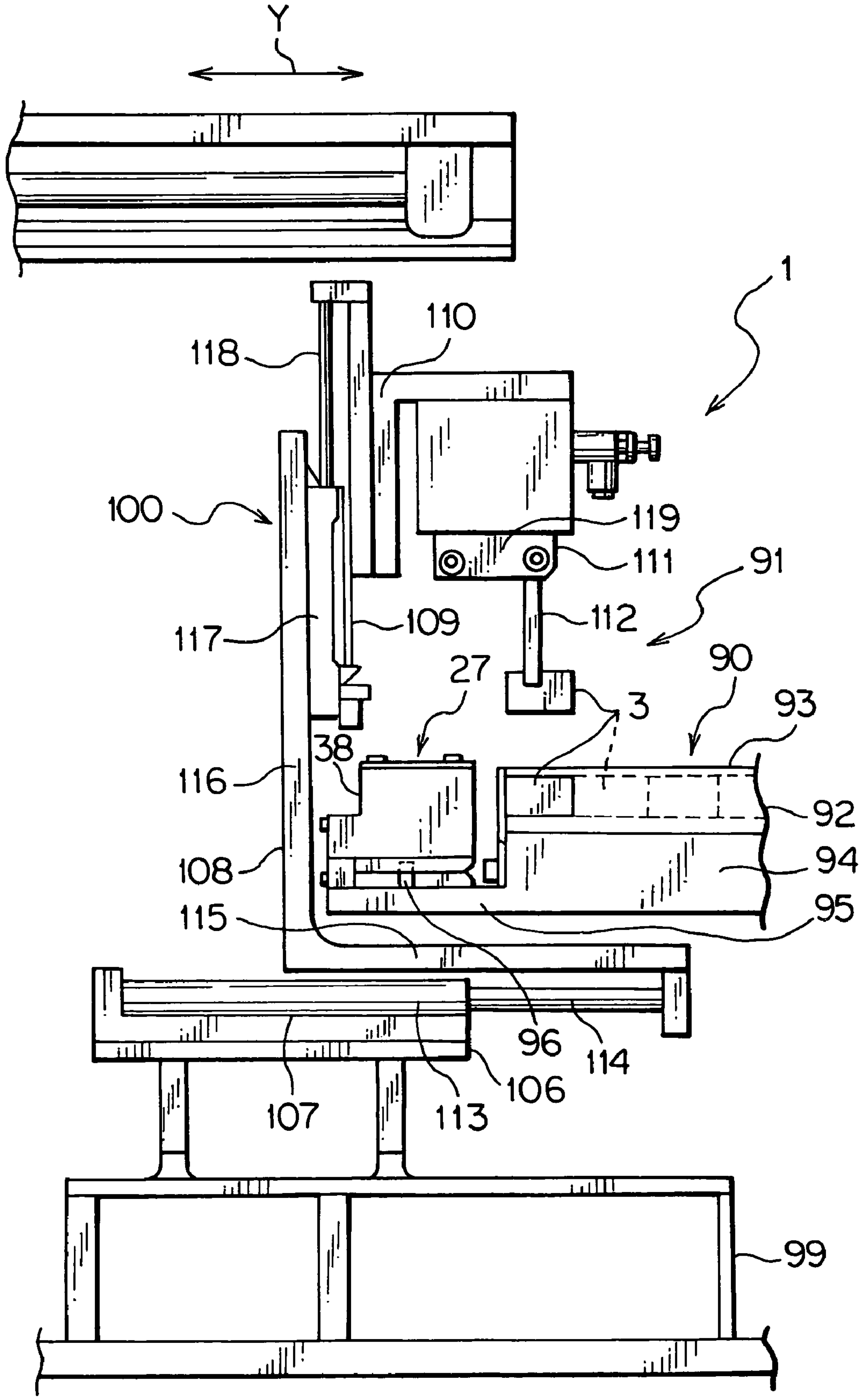
FIG. 14 is a side view showing a condition that the rod of the up/down cylinder of the housing moving unit shown in FIG. 13 expands.
Figure 15:
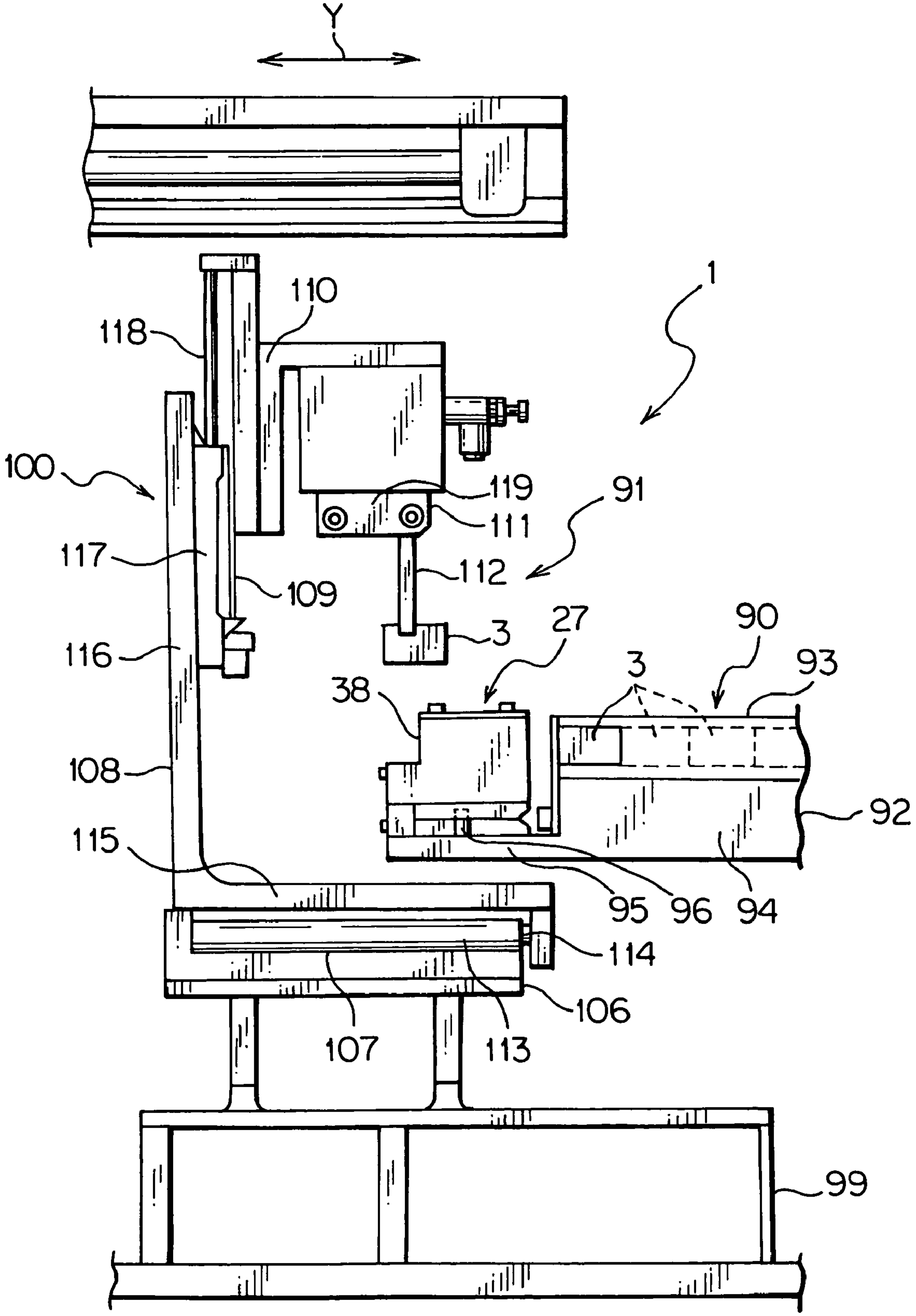
FIG. 15 is a side view showing a condition that the rod of the slide cylinder of the housing moving unit shown in FIG. 14 contracts.
Figure 16:
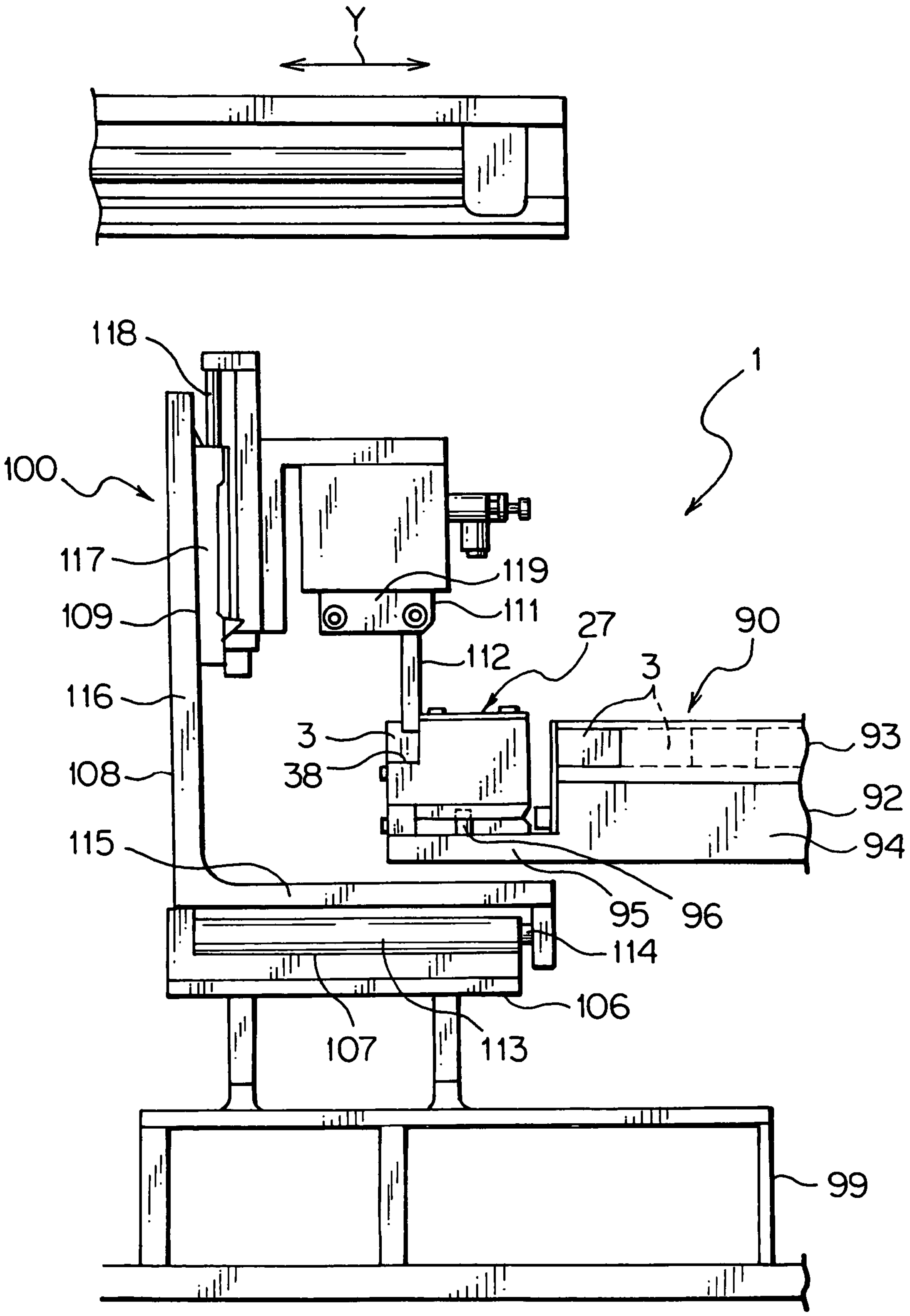
FIG. 16 is a side view showing a condition that the rod of the up/down cylinder of the housing moving unit shown in FIG. 15 contracts.

Thereby, the chuck cylinder 111 positions above the connector housing 3 in the housing supplier 93. After that, the control unit 15 makes the rod 118 of the up/down cylinder 109 of the housing moving unit 100 contract, and simultaneously the rods 120 of the chuck cylinder 111 approach to each together. Thus, the connector housing 3 in the housing supplier 93 is gripped (chucked) by the housing moving unit 100. The control unit 15 makes the rod 118 of the up/down cylinder 109 of the housing moving unit 100 expand as shown in FIG. 14. The control unit 15 makes the rod 114 of the slide cylinder 107 of the housing moving unit 100 contact as shown in FIG. 15.

Figure 17:
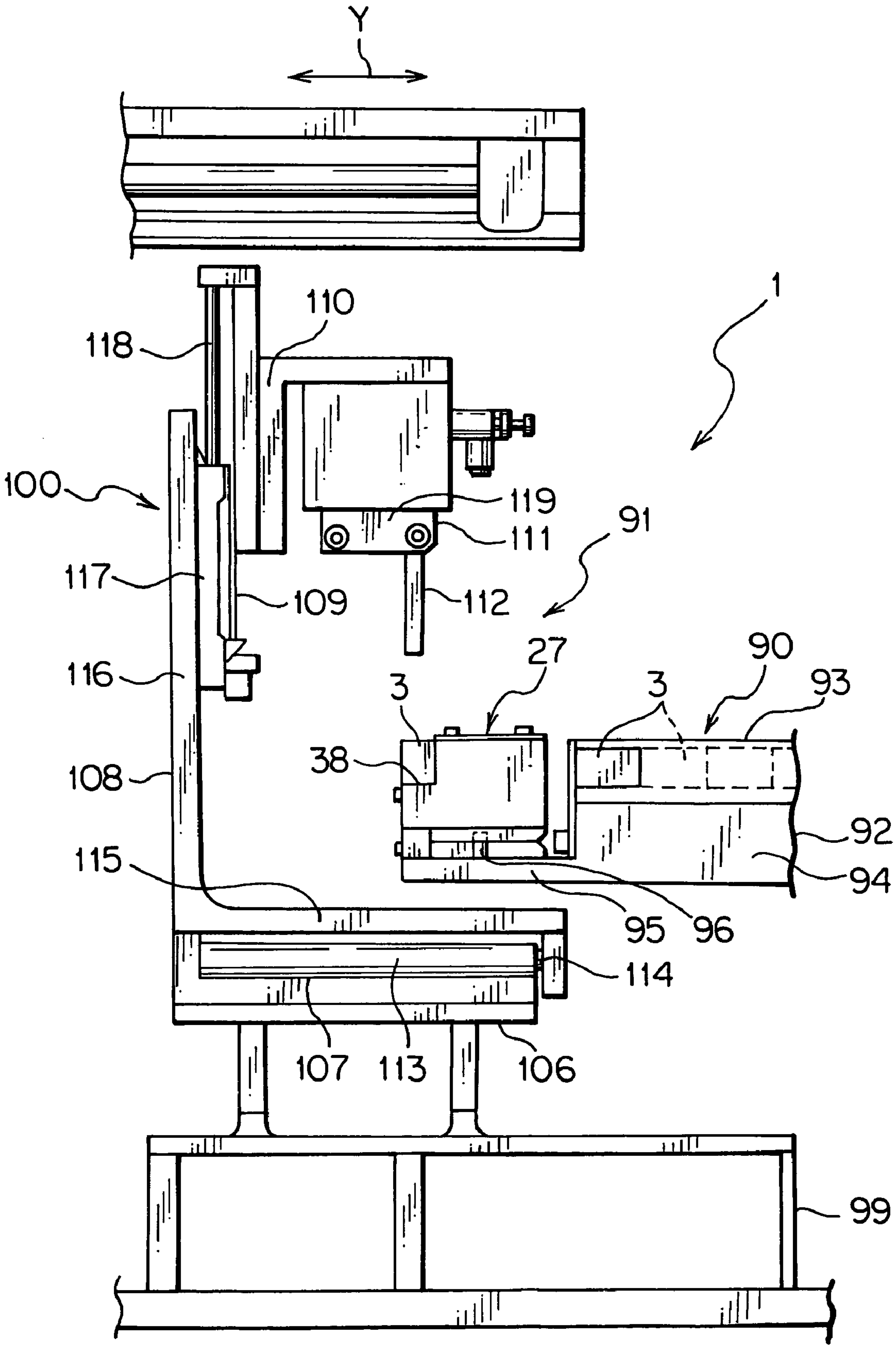
FIG. 17 is a side view showing a condition that the rod of the up/down cylinder of the housing moving unit shown in FIG. 16 expands.

After that, the control unit 15 makes the rod 118 of the up/down cylinder 109 contract, and inserts the chucked connector housing 3 into the cutout 38 of the holding jig 27, and simultaneously makes the rod 120 of the chuck cylinder 111 depart from each other. Then, the control unit 15 makes the rod 118 of the up/down cylinder 109 of the housing moving unit 100 expand as shown in FIG. 17. Thus, the control unit 15 makes the housing moving unit 100 transport the connector housing 3 from the hosing supplier 93 to the holding jig 27.

Figure 18:
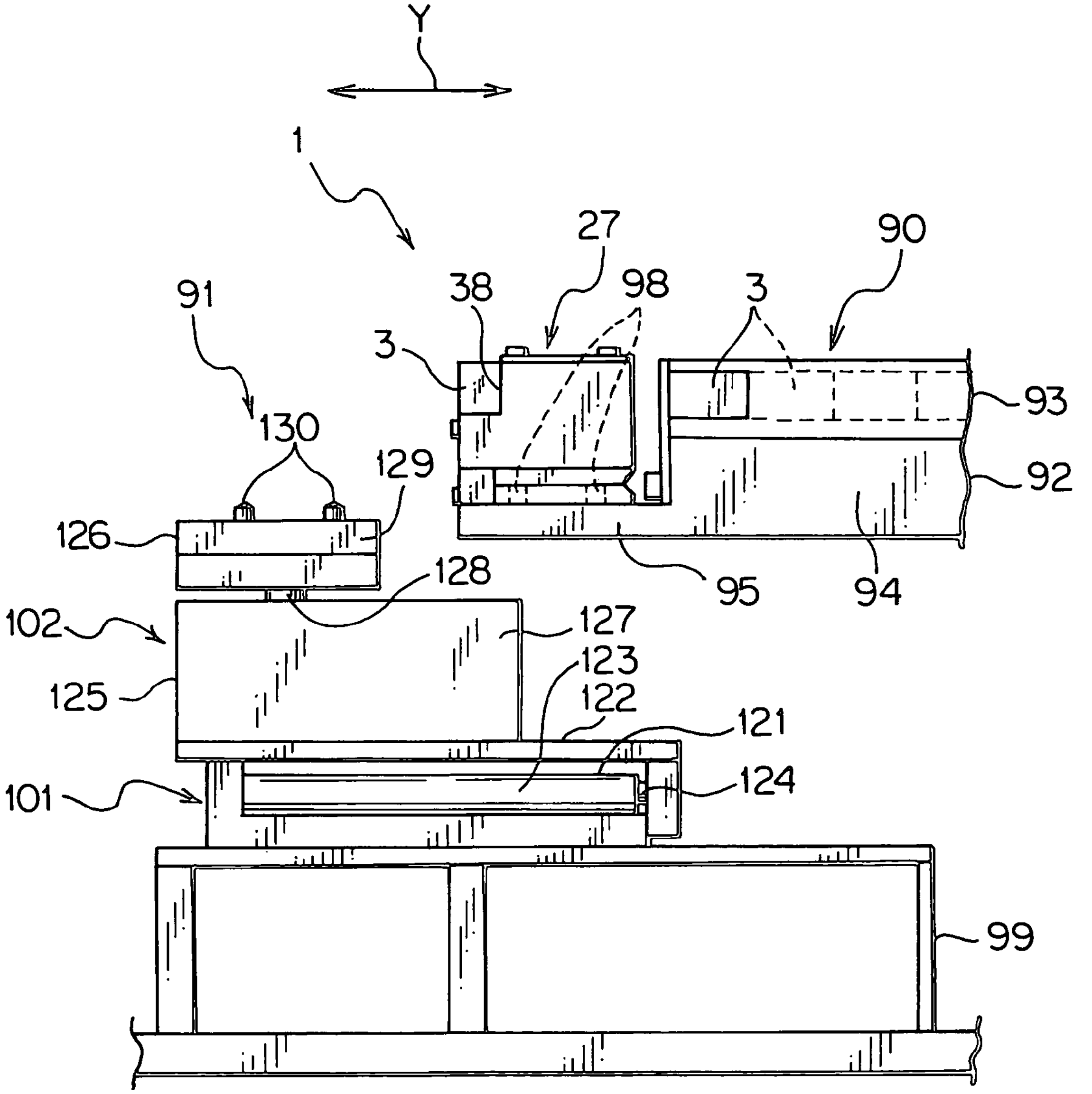
FIG. 18 is a side view showing a slide unit and a jig pushing-up unit of the jig transporting unit of the terminal inserting apparatus in FIG. 1.
Figure 19:
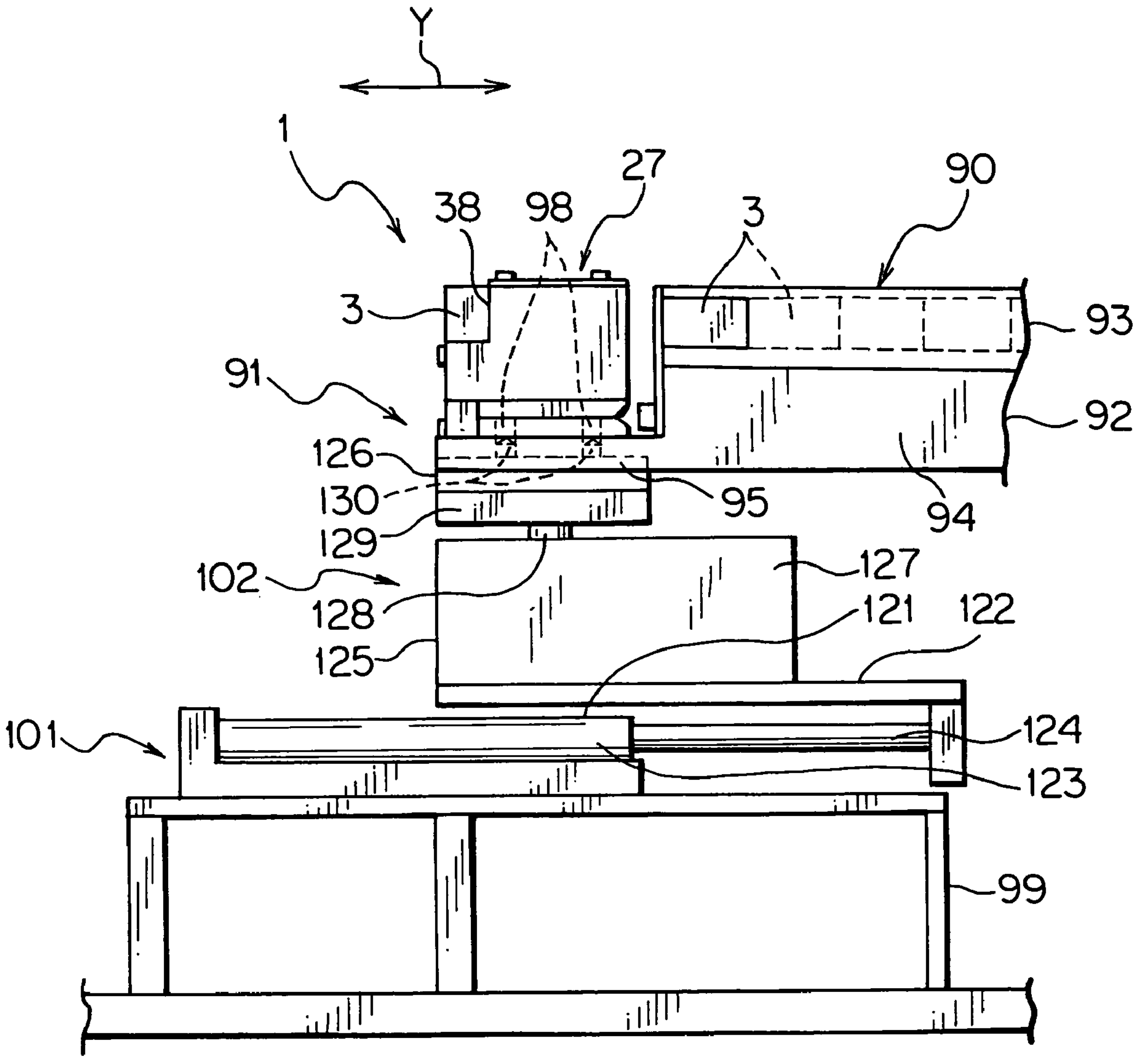
FIG. 19 is a side view showing a condition that a rod of a slide cylinder of a slide unit shown in FIG. 18 expands.

The control unit 15 moves the moving table 99 as shown in FIG. 18, and arranges the holding jig 27, in which the connector housing 3 is transported by the housing moving unit 100, and the jig pushing-up unit 102 along the arrow Y. At the time, the rod 128 of the up/down cylinder 125 contracts and the rod 124 of the slide cylinder 121 of the slide unit 101 contracts. Thereby, the pushing-up tray 126 of the jig pushing-up unit 102 is positioned under the holding jig 27.

Figure 20:
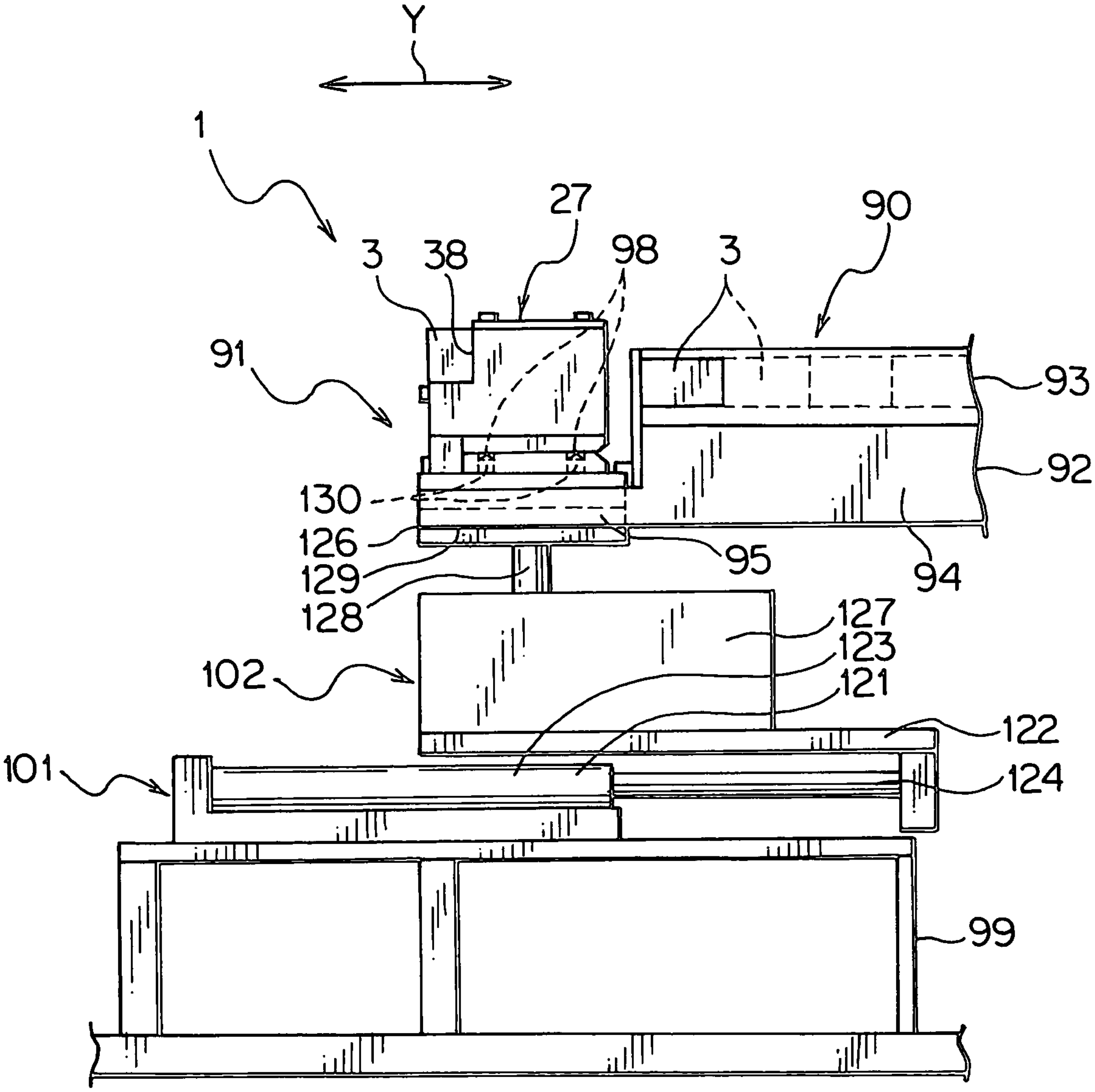
FIG. 20 is a side view showing a condition that a rod of an up/down cylinder of a jig pushing-up unit shown in FIG. 19 expands.
Figure 21:
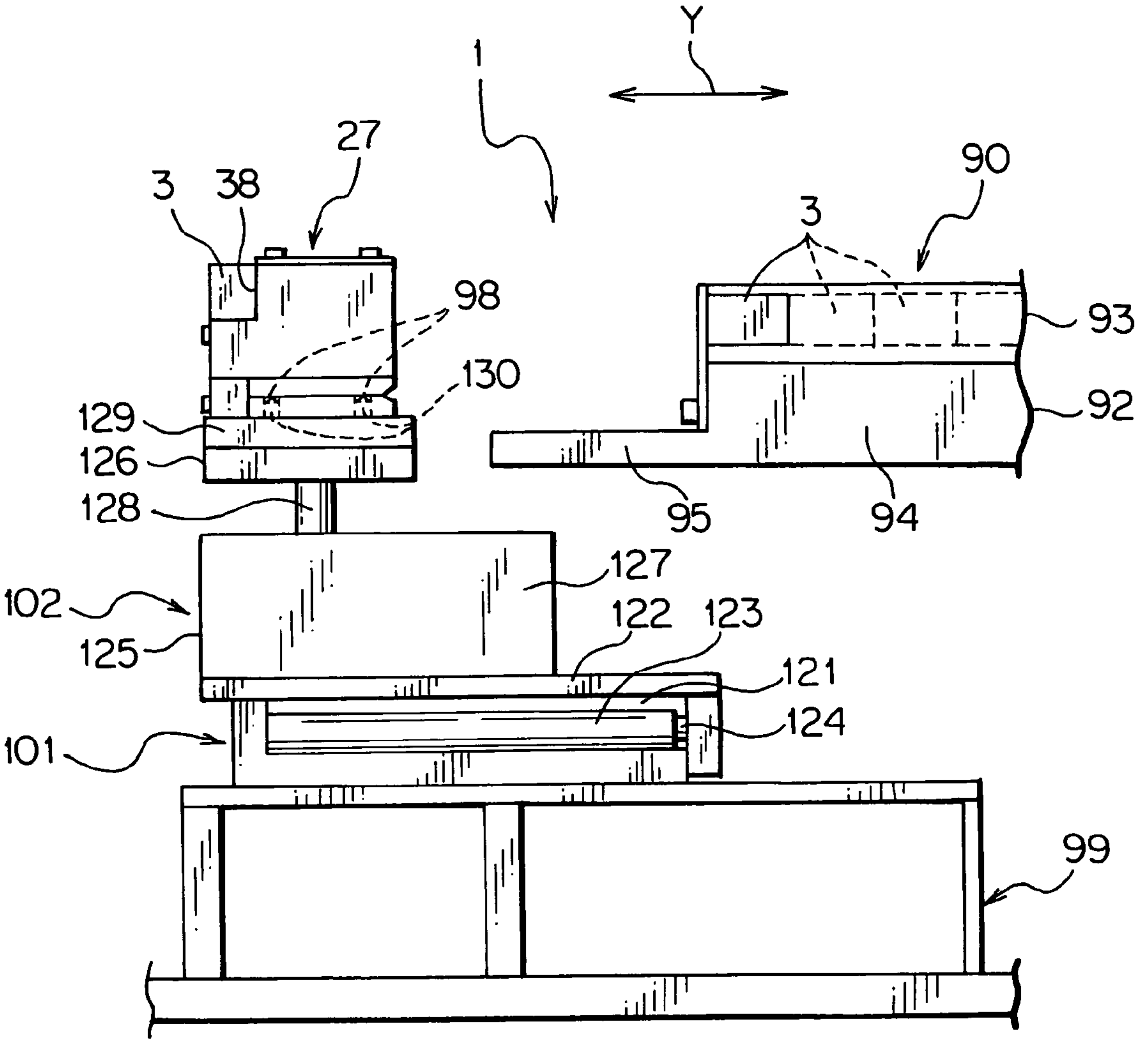
FIG. 21 is a side view showing a condition that the rod of the slide cylinder of the slide unit shown in FIG. 20 contracts.
Figure 22:
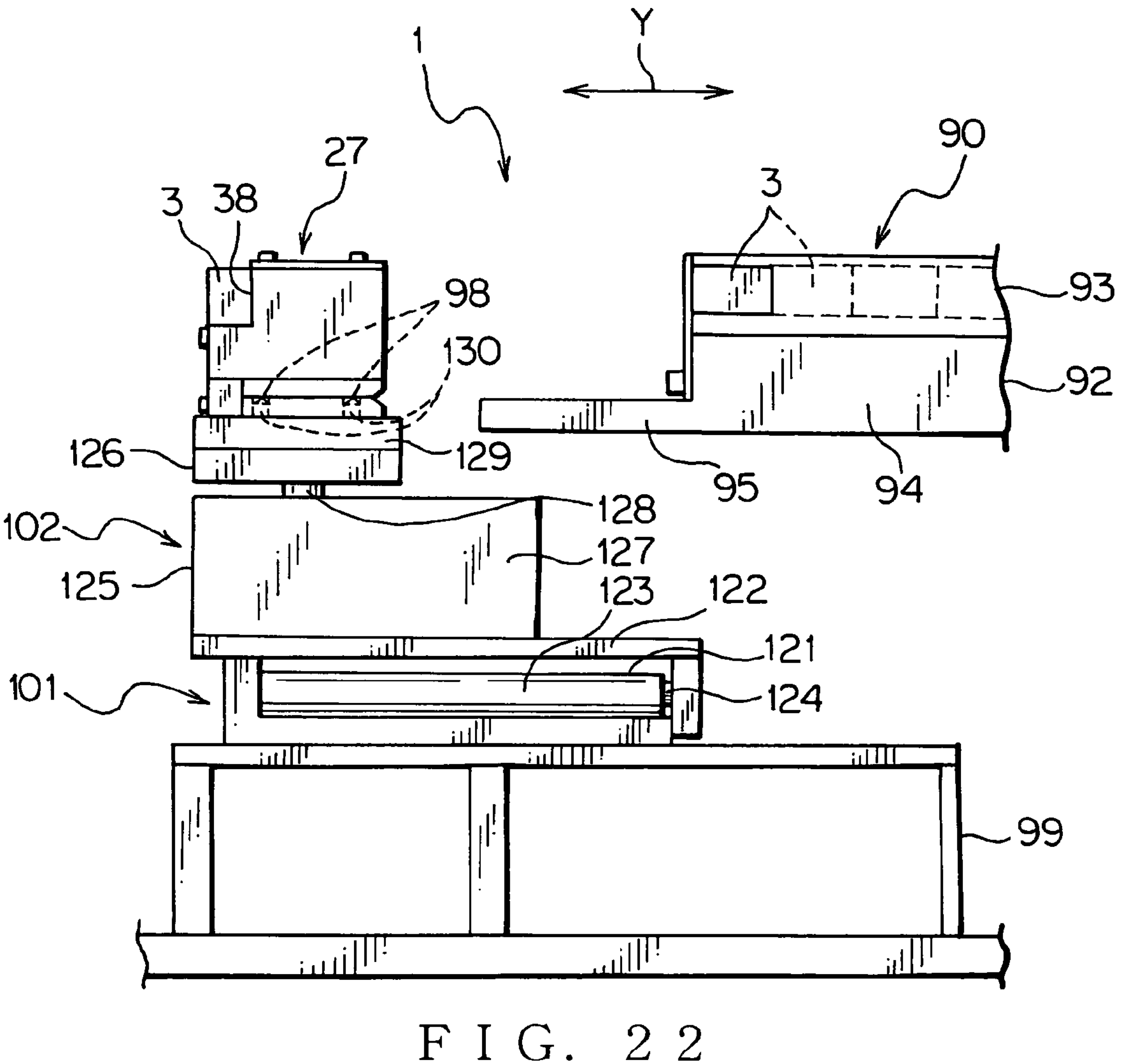
FIG. 22 is a side view showing a condition that the rod of the up/down cylinder of the jig pushing-up unit shown in FIG. 21 contracts.

The control unit 15 makes the rod 128 of the up/down cylinder 125 of the jig pushing-up unit 102 expand as shown in FIG. 20, and pushes up the holding jig 27 with the pushing-up tray 126 from the jig mount tray 92 of the jig mounting unit 90. The control unit 15 makes the rod 124 of the slide cylinder 121 of the slide unit 101 of the jig transporting unit 91 contract as shown in FIG. 21. Thereafter, the control unit 15 makes the rod 128 of the up/down cylinder 125 of the jig pushing-up unit 102 of the jig transporting unit 91 contract as shown in FIG. 22. Thus, the control unit 15 pulls out the holding jig 27 from the jig mount-stray 92 to the housing holding unit 12 by the jig pushing-up unit 102 and the slide unit 101 of the jig transporting unit 91.

Figure 23:
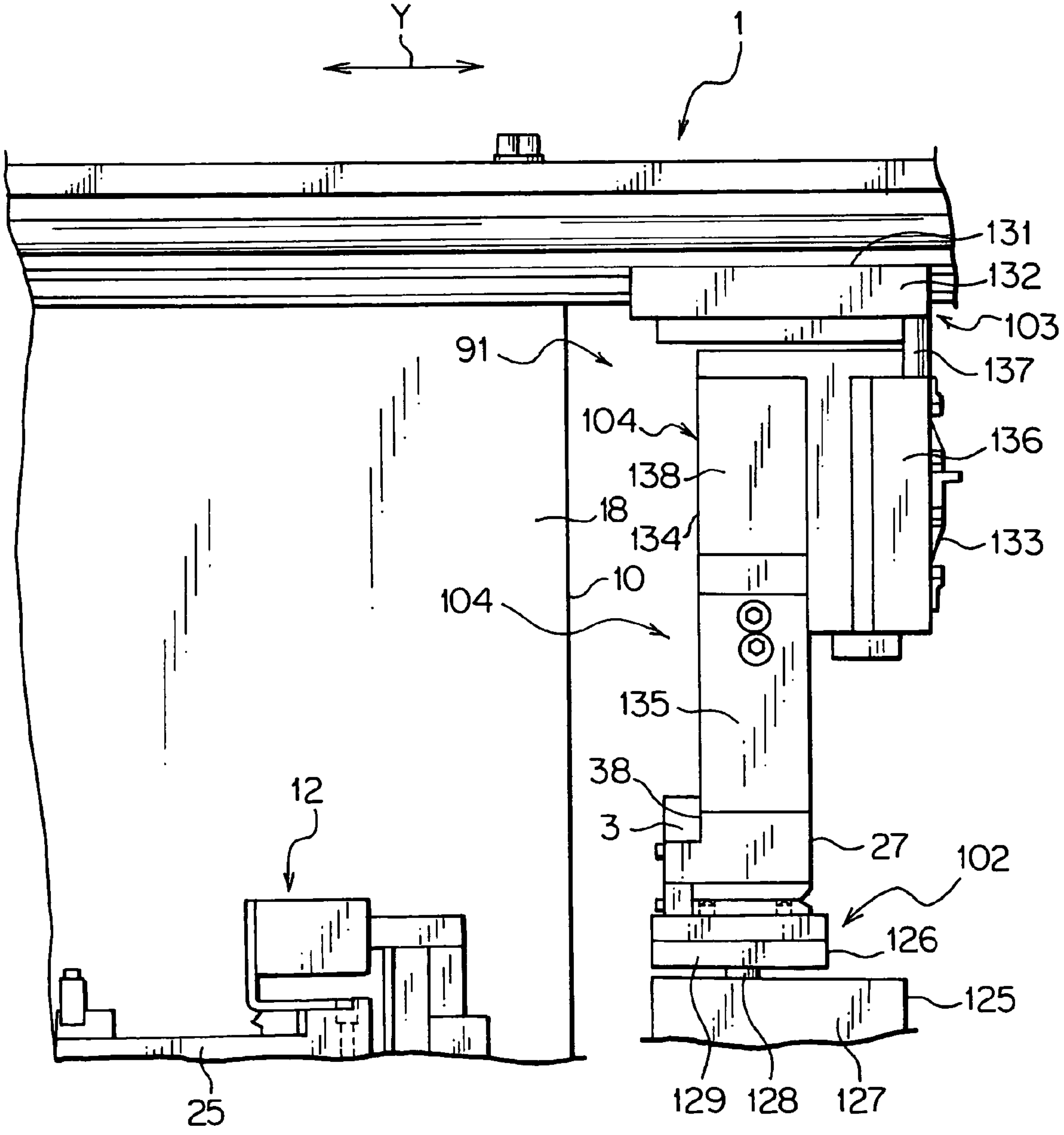
FIG. 23 is a side view showing a condition that a gripping unit is placed above the jig pushing-up unit shown in FIG. 22.

Thereafter, the control unit 15 moves the cylinder body 132 of the slide cylinder 131 of the second slide unit 103 along the arrow Y, and positions the aforesaid one gripping unit 104 above the holding jig 27 on the pushing-up tray 126 as shown in FIG. 23. At the time, the control unit 15 makes the rod 137 of the up/down cylinder 133 of the gripping unit 104 contract and the rods 139 of the chuck cylinder 134 depart from each other.

Figure 24:
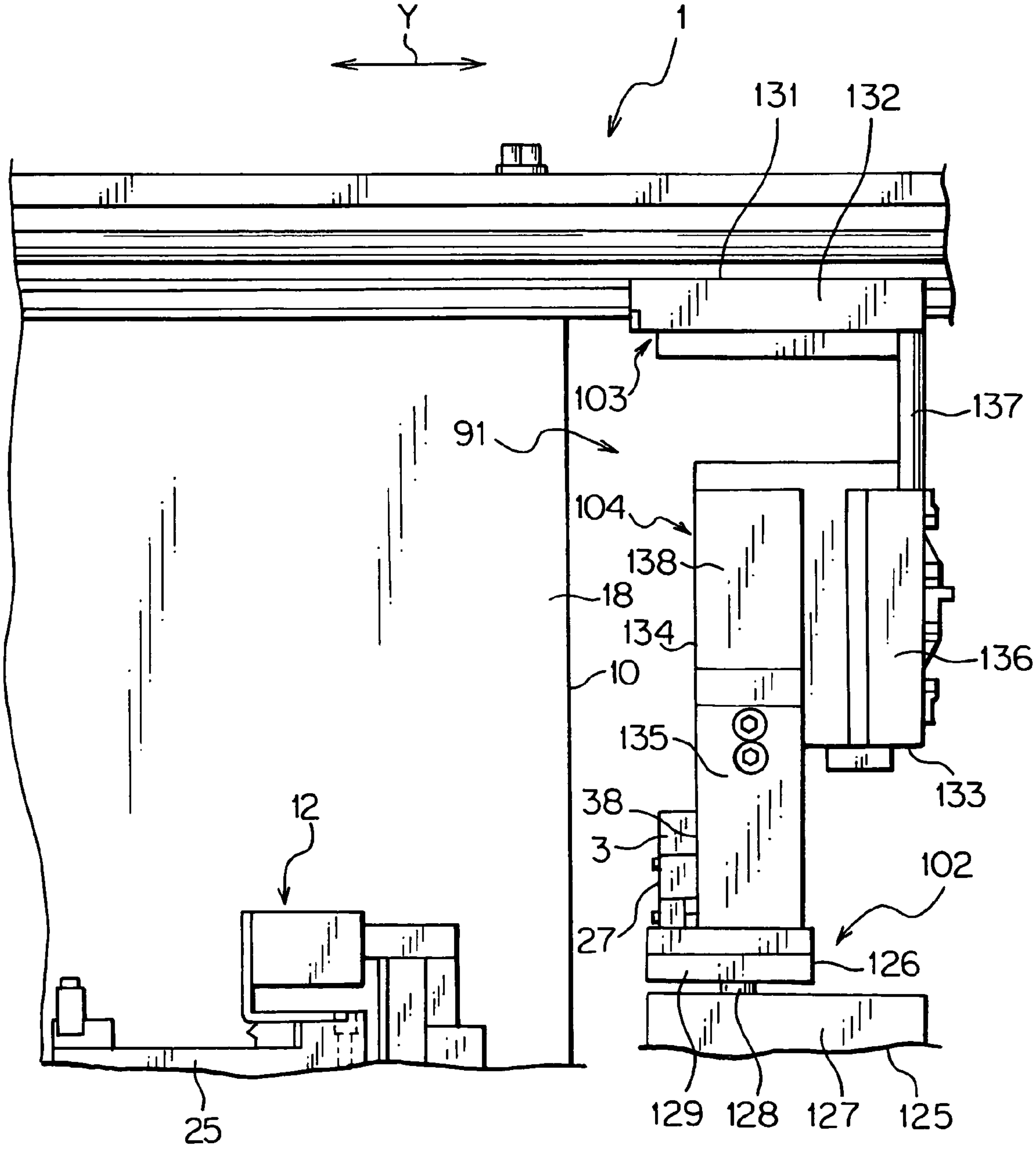
FIG. 24 is a side view showing a condition that the rod of the up/down cylinder of the gripping unit shown in FIG. 23 expands.
Figure 25:
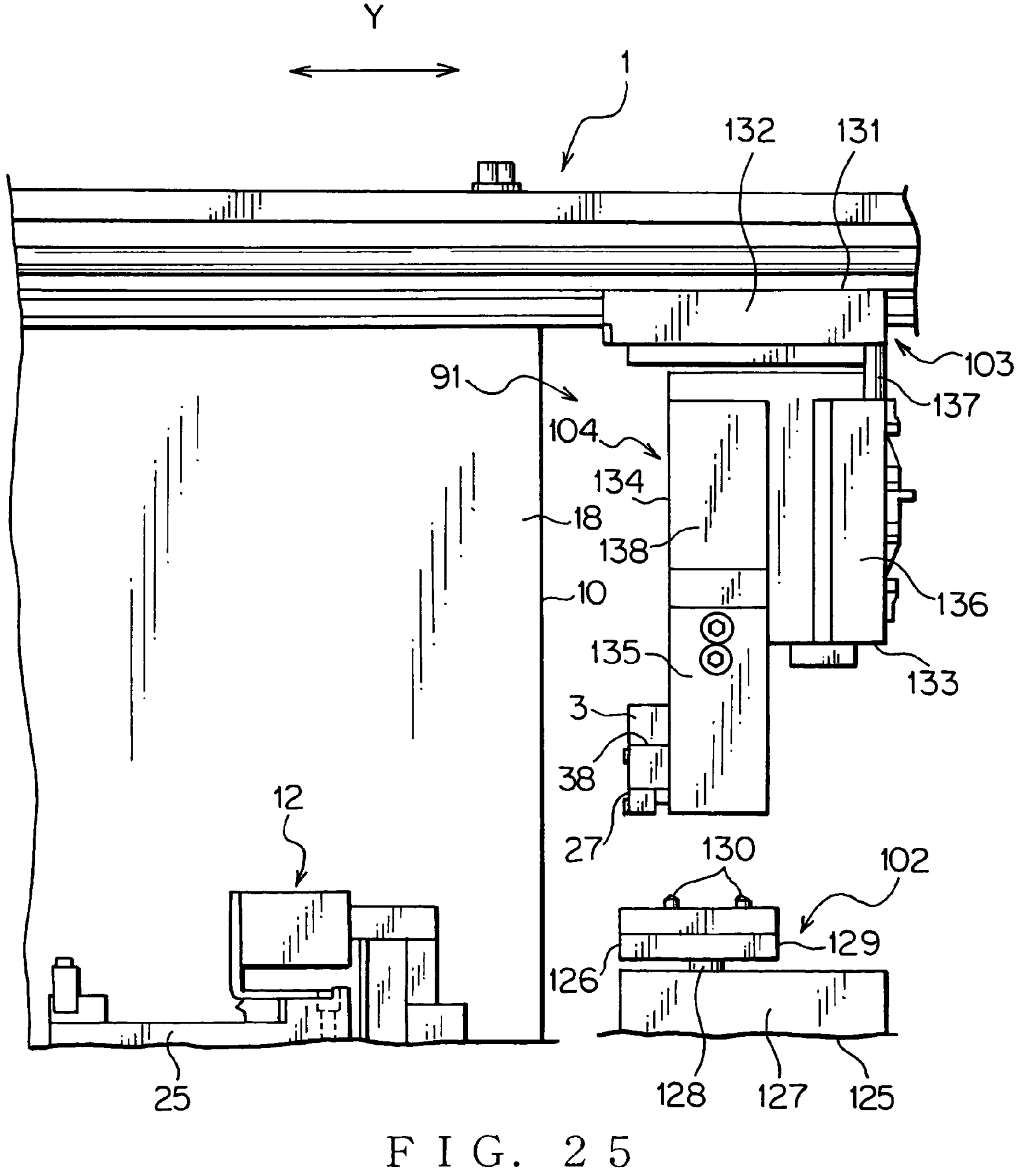
FIG. 25 is a side view showing a condition that the rod of the up/down cylinder of the gripping unit shown in FIG. 24 contracts.

The control unit 15 makes the rod 137 of the up/down cylinder 133 of the aforesaid one gripping unit 104 expand as shown in FIG. 24. After that, the control unit 15 clamps (chuck) the holding jig 27 between the pair of jig chucks 135 by making the rods 139 of the chuck cylinder 134 approach to each other. Then, the control unit 15 pushes up the holding jig 27 from the pushing-up tray 126 by making the rod 137 of the up/down cylinder 133 contract as shown in FIG. 25.

Figure 26:
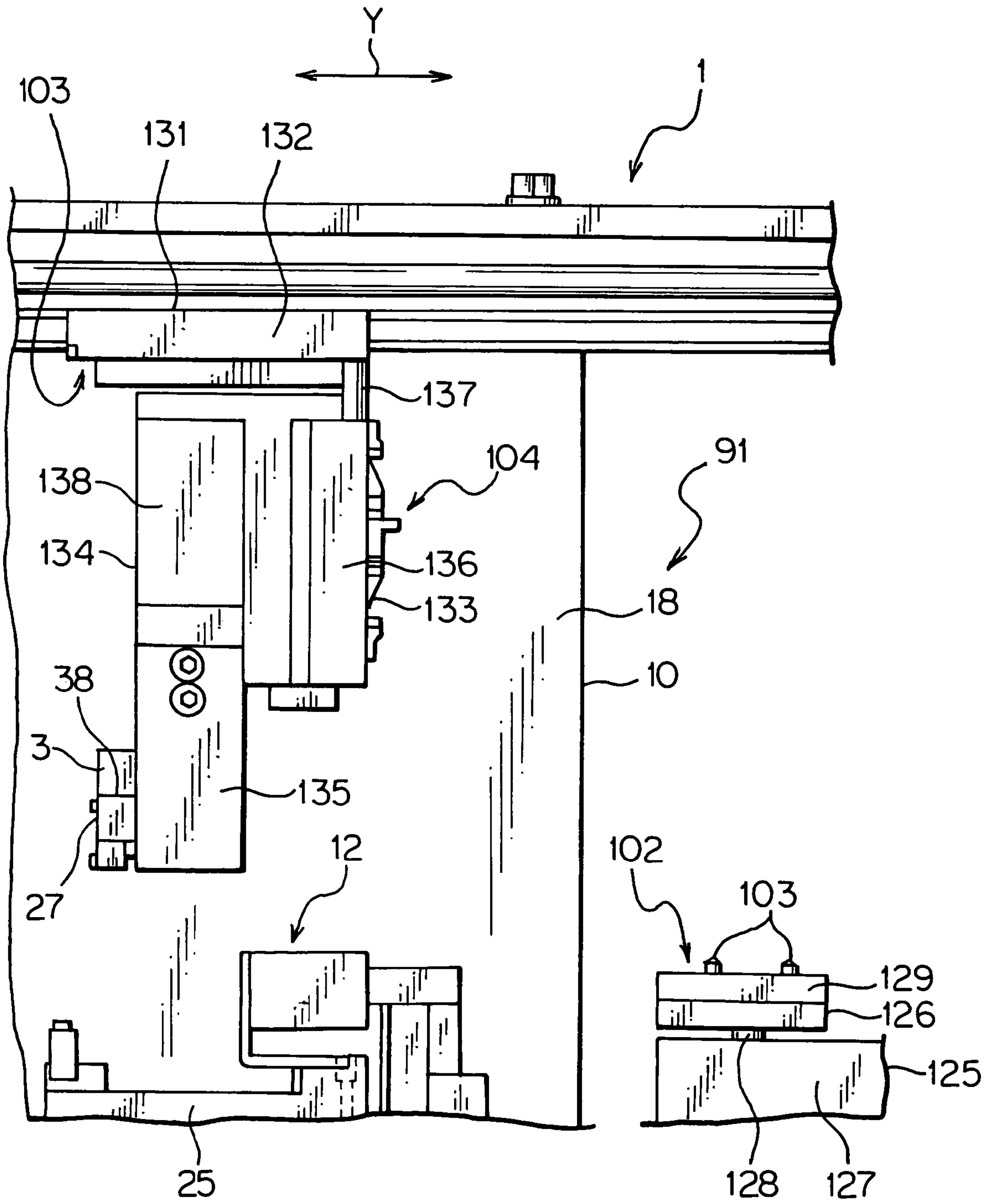
FIG. 26 is a side view showing a condition that the gripping unit shown in FIG. 25 is placed above a support table of a housing holding unit.

The control unit 15 positions the holding jig 27, clamped (chucked) by the one gripping unit 104, above the support table 25 of the housing holding unit 12 as shown in FIG. 26, by controlling both the second slide unit 103 of the jig transporting unit 91 and the horizontal moving unit 23 of the housing holding unit 12.

Figure 27:
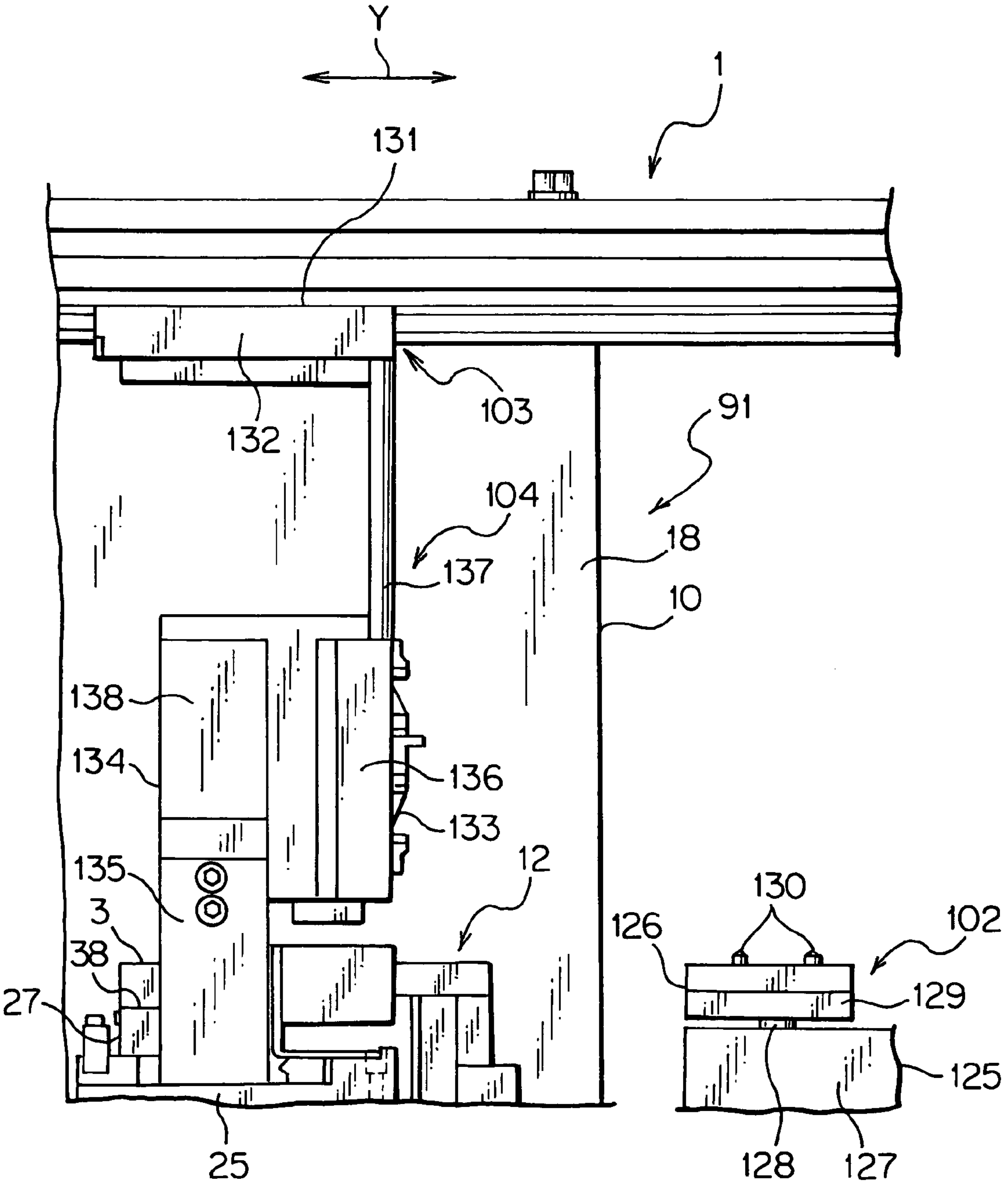
FIG. 27 is a side view showing a condition that the rod of the up/down cylinder of the gripping unit shown in FIG. 26 expands.
Figure 28:
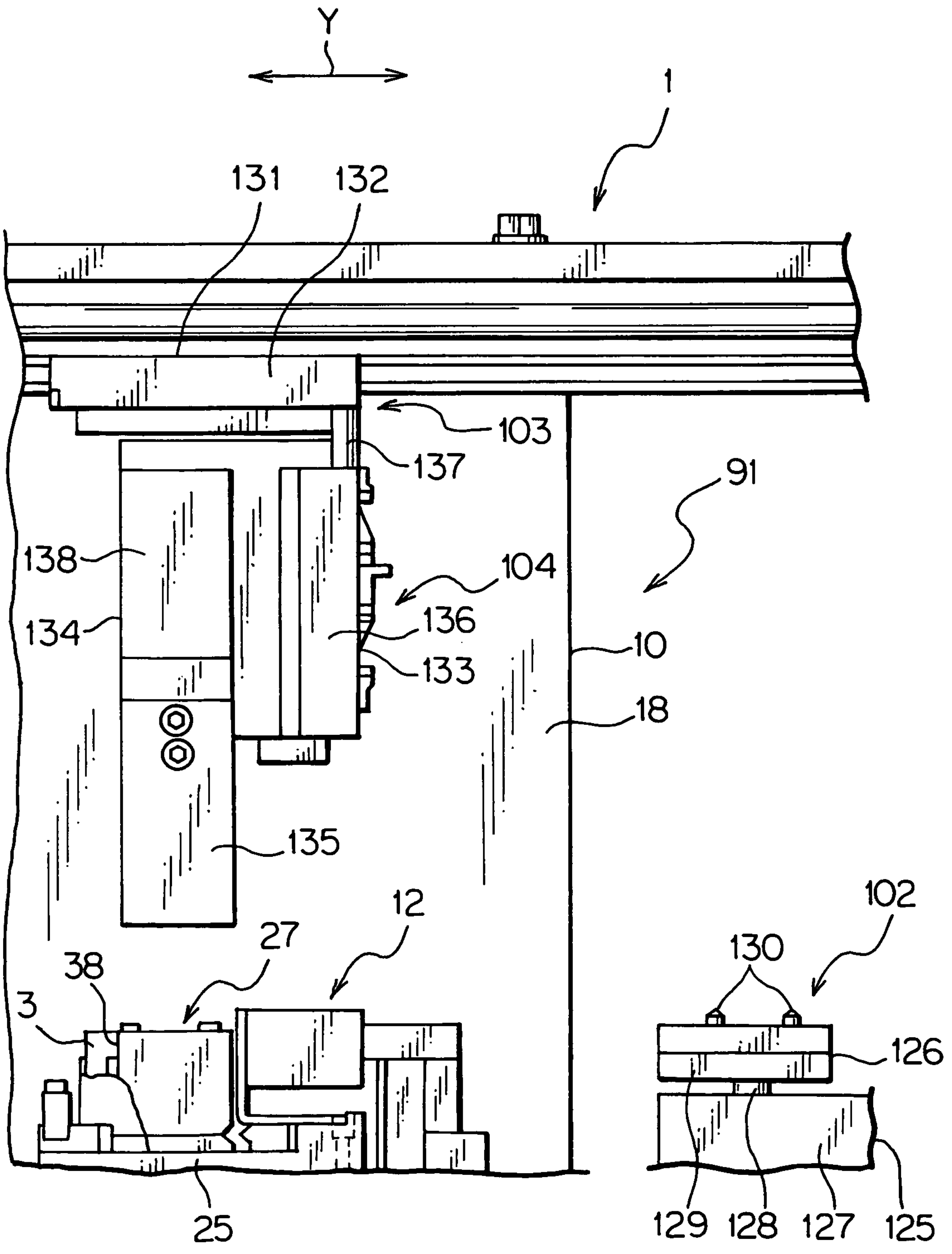
FIG. 28 is a side view showing a condition that the rod of the up/down cylinder of the gripping unit shown in FIG. 27 contracts.
Figure 29:
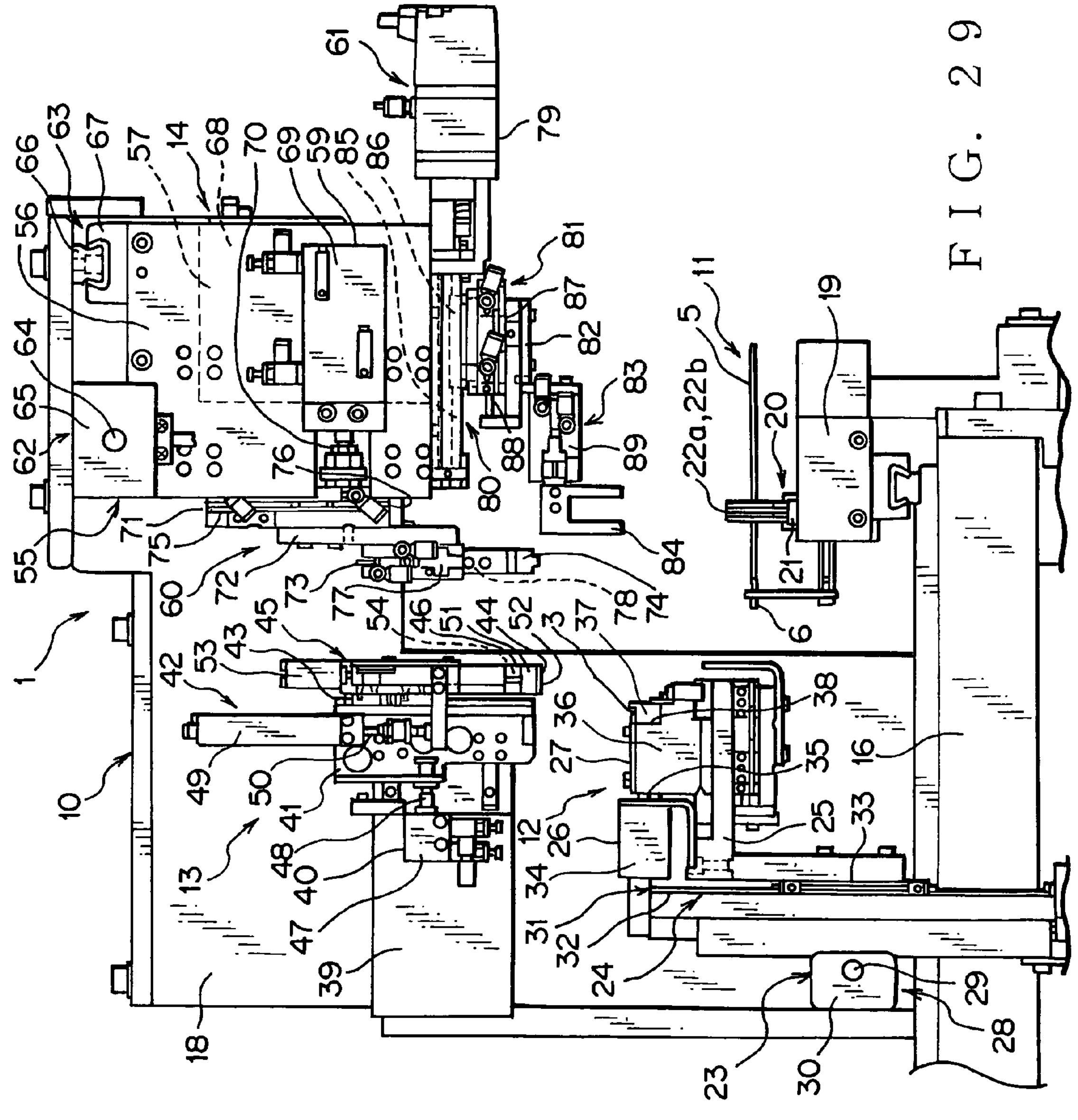
FIG. 29 is a side view showing a condition that the holding jig is mounted on the housing holding unit of the terminal inserting apparatus shown in FIG. 5 and the terminal is inserted into the connector housing.

The control unit 15 positions the holding jig 27, gripped (chucked) by the one gripping unit 104, on the support table 25 of the housing holding unit 12 as shown in FIG. 27, by making the rod 137 of the up/down cylinder 133 of the one gripping jig 104 expand. Furthermore, the control unit 15 makes the rod 139 of the chuck cylinder 134 depart from each other. The control unit 15 makes the rod 137 of the up/down cylinder 133 of the aforesaid one gripping unit 104 contract as shown in FIG. 28. Thus, the control unit 15 selects one holding jig 27 of the plurality of holding jigs 27, and transfers the selected one holding jig 27 from the jig mounting unit 90 to the housing holding unit 12.

The control unit 15 makes the up/down unit 24 of the housing holding unit 12 push up the holding jig 27 and makes the connector-fixing cylinder 26 maintain the holding jig 27 in the condition of limiting falling-out. Furthermore, the control unit 15 makes the rod 48 of the front/rear cylinder 40 of the guide unit 13 expand, and the up/down cylinder 42 and the rod. 50 of the control contract.

The control unit 15 makes the up/down cylinder 57 of the inserting unit 14 and the rod 70 of the inserting cylinder 59 contract. The control unit 15 makes the rod 76 of the up/down cylinder 71 of the front chuck unit 60 of the inserting unit 14 contract, and the rods 78 of the chuck cylinder 73 depart from each other. The control unit 15 makes the rod 88 of the pull-check cylinder 81 of the wire chuck unit 61 of the inserting unit 14 expand, and the rods of the chuck cylinder 83 depart from each other.

Firstly, the control unit 15 positions the terminal receiving chamber 4, into which the terminal 6 is firstly inserted, under the guide plates 44, 46 of the guide unit 13 by controlling the horizontal moving unit 23 of the housing holding unit 12. Then, the control unit 15 positions the front chuck unit 60 of the inserting unit 14 above the terminal 6 to be firstly inserted into the terminal receiving chamber 4 and positions the wire chuck unit 61 of the inserting unit 14 above the electric wire 5 connected with the terminal 6, by controlling the horizontal moving unit 55 of the inserting unit 14.

After that, the control unit 15 makes the rod 50 of the up/down cylinder 42 of the guide unit 13 expand so as to overlap the fixed guide plate 44 to the opening of the terminal receiving chamber 4 of the connector housing 3 held in the holding jig 27 as shown in FIG. 30. The control unit 15 makes the rod 76 of the up/down cylinder 71 of the front chuck unit 60 of the inserting unit 14 expand, and makes the wire chuck unit 61 of the front chuck unit 60 approach to the terminal 6 and the electric wire 5 held by the wire holding unit 11 by controlling the up/down cylinder 57 of the inserting unit 14.

In the above condition, the terminal 6 is positioned between the pair of front chucks 74 and the electric wire 5 is positioned between the pair of wire chucks 84. The control unit 15 makes the electric wire 5 chucked (gripped) between the front chucks 74 and between the wire chucks 84 by controlling the chuck cylinders 73, 83 of the chuck units 60, 61.

Figure 31:
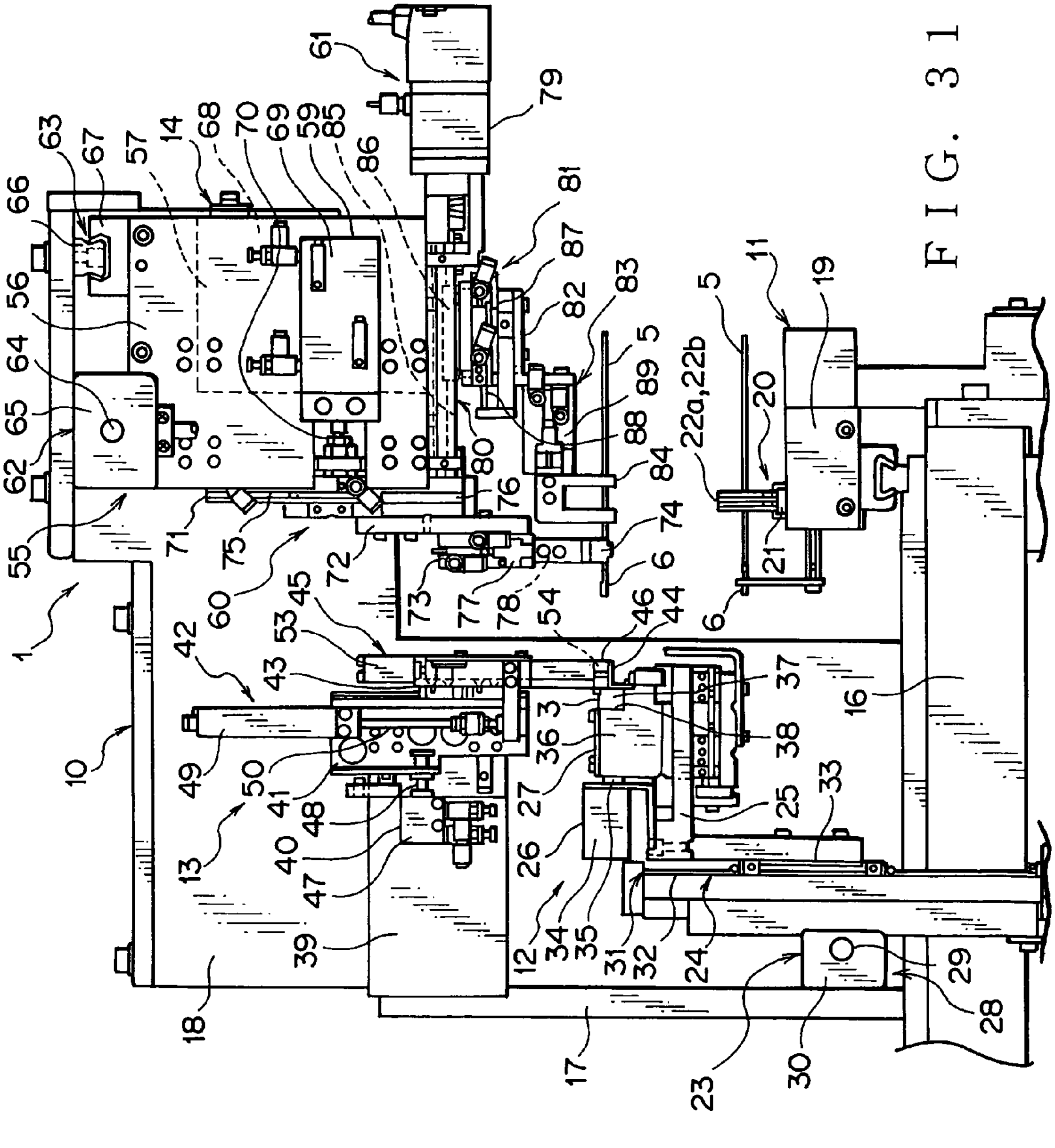
FIG. 31 is a side view showing a condition that the guide plate abuts tightly on the connector housing and chuck unit moves up in the condition shown in FIG. 30.

Thereafter, the control unit 15 makes the rod 48 of the front/rear cylinder 40 of the guide unit 13 contract so as to place the fixed guide plate 44 tightly to the connector housing 3 held in the holding jig 27 as shown in FIG. 31. The control unit 15 make a bottom end of the moving guide plate 46 abut on the horizontal portion 52 of the fixed guide plate 44 by controlling the guide open/close device 45.

The control unit 15 pushes up the chuck units 60, 61 by controlling the up/down cylinder 57 of the inserting unit 14, and removes the chucked electric wire 5 connected with the terminal 6 from the bar 20 of the wire holding unit 11, as shown in FIG. 31. Thereby, the terminal receiving chamber 4 of the connector housing 3 held in the holding jig 27 corresponds to the electric wire 5 connected with the terminal 6 chucked by the front chuck unit 60.

Figure 32:
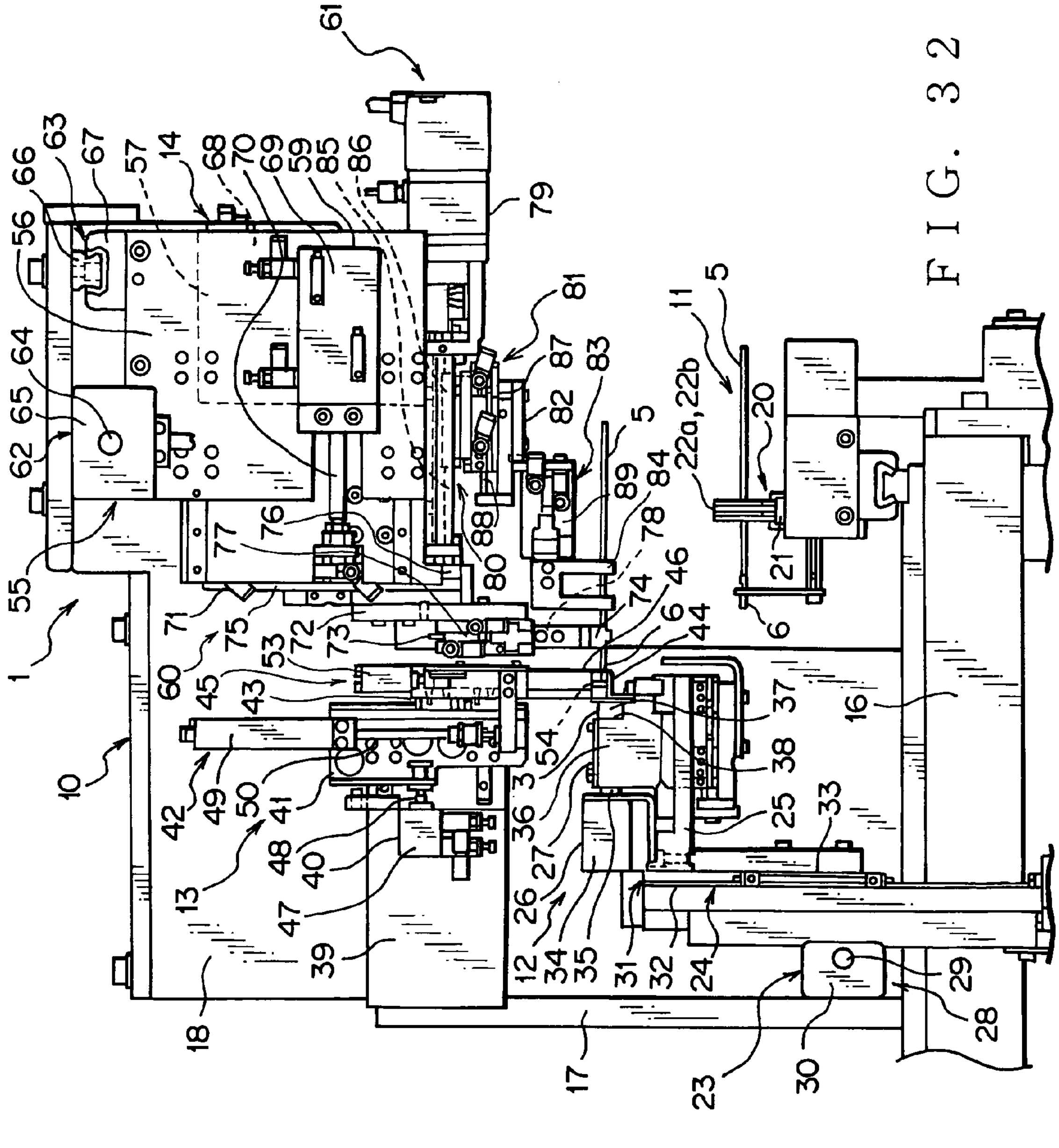
FIG. 32 is a side view showing a condition that the terminal is inserted into a guide cutout of the guide plate in the condition shown in FIG. 31.
Figure 33:
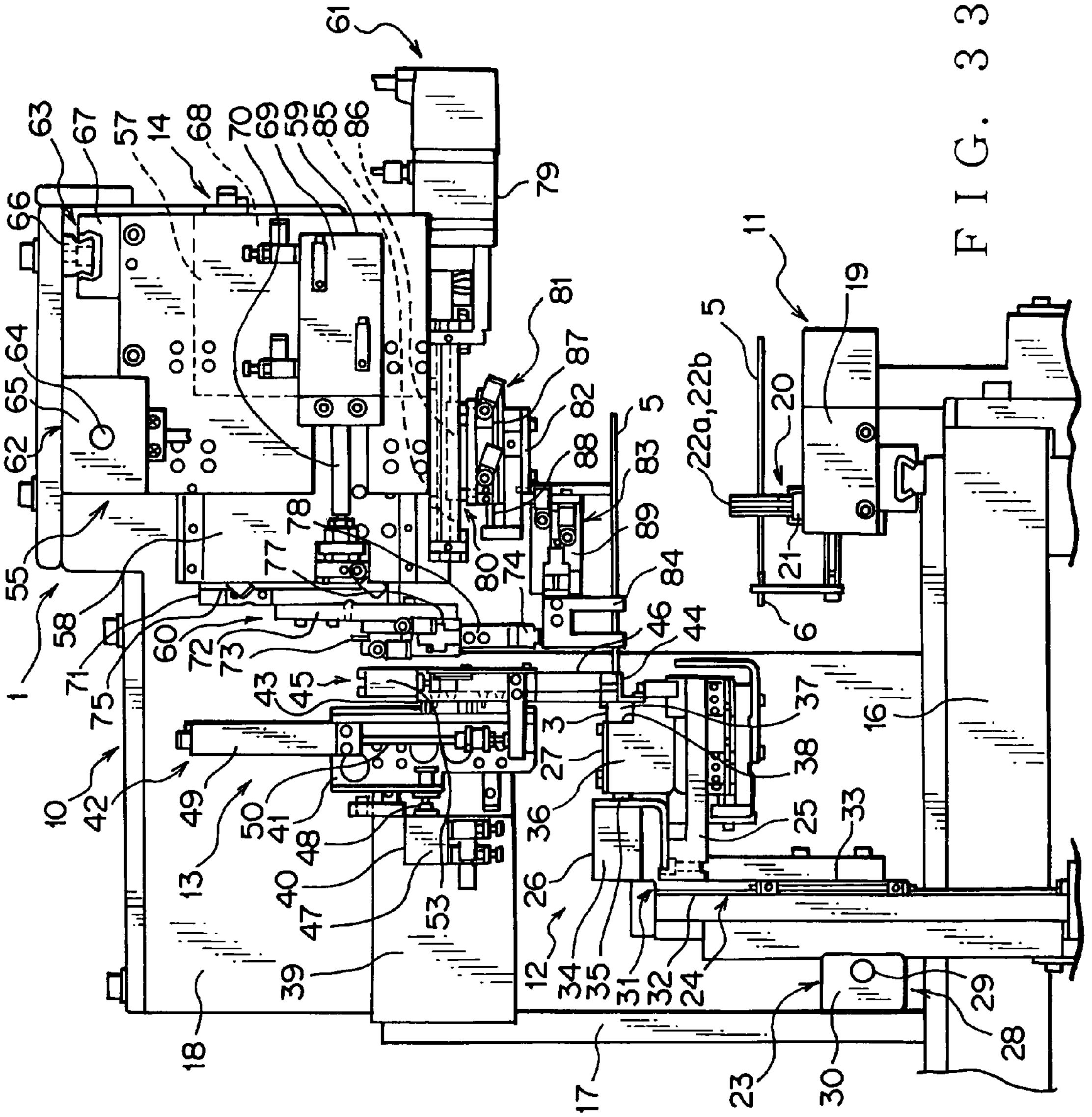
FIG. 33 is a side view showing a condition that the terminal is inserted into a terminal receiving chamber of the connector housing in the condition shown in FIG. 32.

The control unit 15 makes the rod 70 of the inserting cylinder 59 of the inserting unit 14 expand so as to insert the terminal 6 into the guiding cutout 54 of the moving guide plate 46 of the guide unit 13, as shown in FIG. 32. After that, the control unit 15 makes the front chuck 74 depart from the electric wire 5 by controlling the chuck cylinder 73 of the front chuck unit 60 of the inserting unit 14, and moves up (depart from the terminal 6) the front chuck 74 by controlling the up/down cylinder 71 of the front chuck unit 60, as shown in FIG. 33. The control unit 15 inserts the terminal 6 into the terminal receiving chamber 4 of the connector housing 3 held in the holding jig 27 by controlling the inserting motor 79 of the inserting unit 14.

Figure 34:
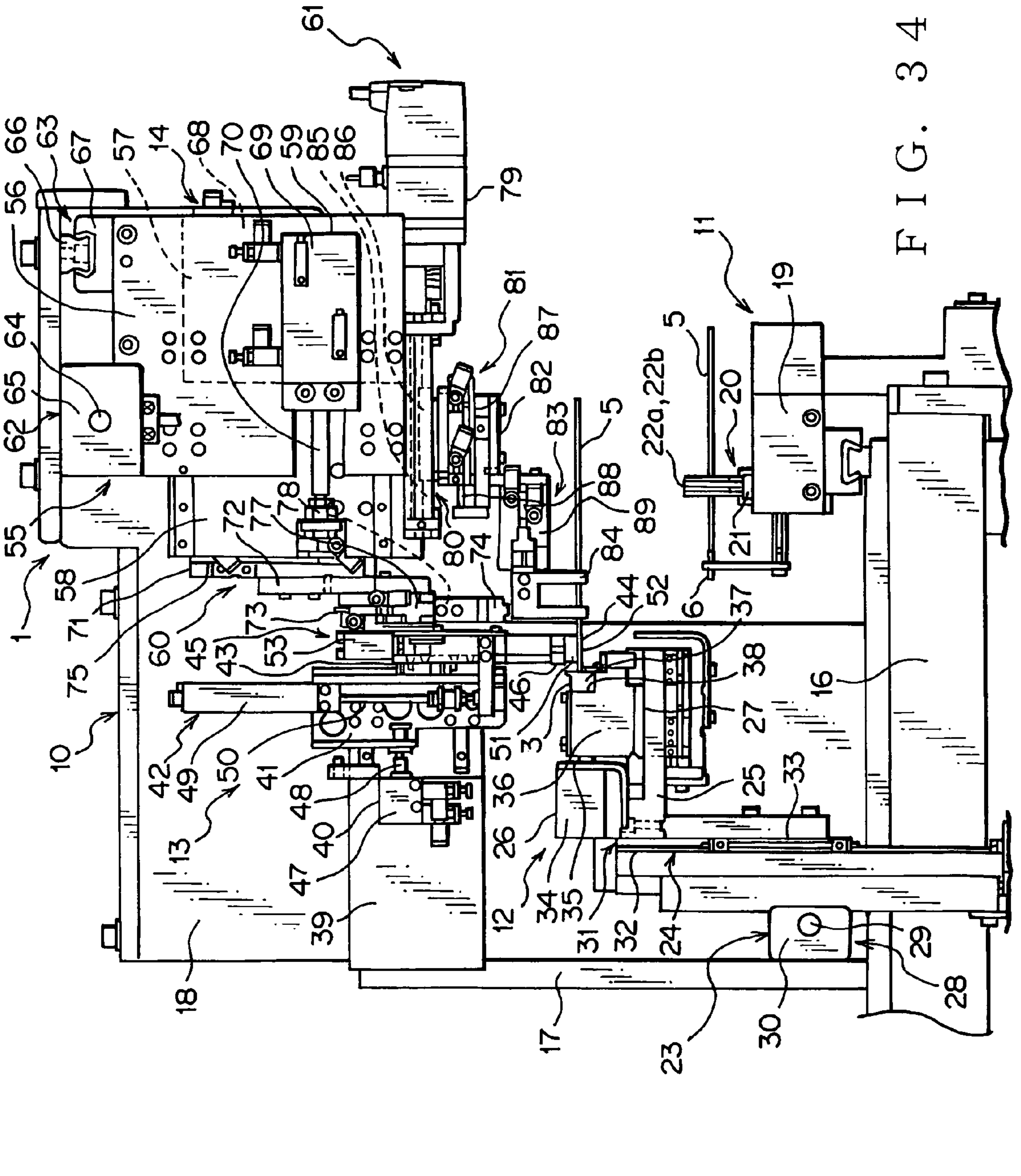
FIG. 34 is a side view showing a condition that a moving guide plate is pushed up and the guide plate departs from the connector housing in the condition shown in FIG. 33.

Thereafter, the control unit 15 pushes up the moving guide plate 46 by controlling the guide open/close device 45 of the guide unit 13, and makes the rod 48 of the front/rear cylinder 40 expand so as to depart the fixed guide plate 44 from the connector housing 3, as shown in FIG. 34. The control unit 15 moves the chuck units 60, 61 of the inserting unit 14 and the holding jig 27 of the housing holding unit 12 together toward this side in FIG. 34 in a condition that the wire chuck 84 is chucking the electric wire 5, by controlling the horizontal moving unit 23 of the housing holding unit 12 and the horizontal moving unit 55 of the inserting unit 14.

Thereby, the electric wire 5 is pulled out from a gap between the horizontal portion 52 and the moving guide plate 46 of the fixed guide plate 44. The control unit 15 makes the wire chuck 84 depart from the electric wire 5 by controlling the wire chuck unit 61. The control unit 15 repeats from a process shown in FIG. 29 to a process shown in FIG. 34so as to insert the terminals 6 into the terminal receiving chambers 4 of the connector housing 3 one by one.

Figure 35:
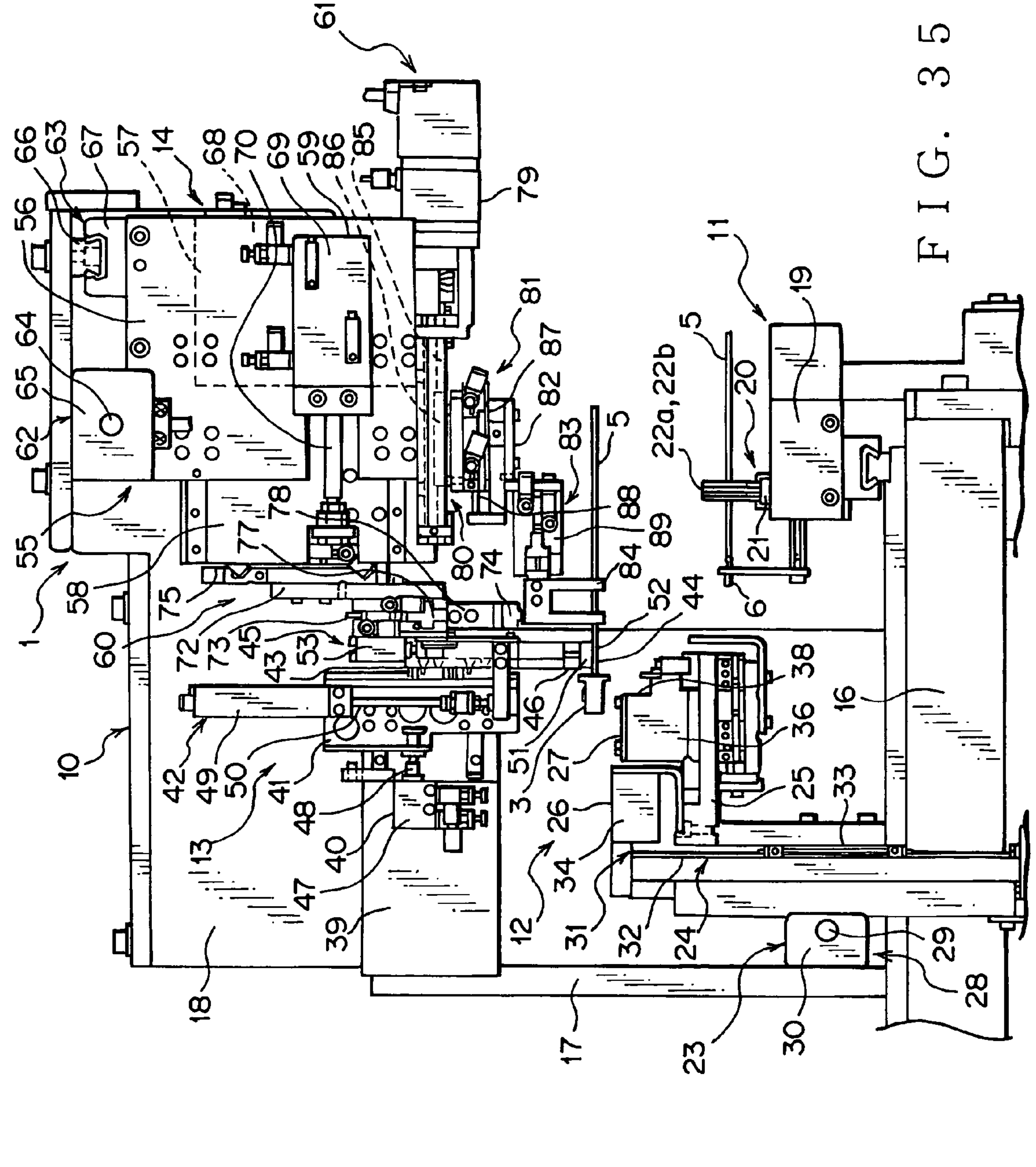
FIG. 35 is a side view showing a condition that the holding jig is moved down in the condition shown in FIG. 34.

After finishing to insert the last terminal 6, the control unit 15 makes the rod 35 of the connector-fixing cylinder 26 of the housing holding unit 12 contract and positions the holding jig 27 in the condition of allowing falling-out. In a condition that the electric wire 5 connected with the terminal 6 inserted last into the terminal receiving chamber 4 is still chucked (gripped) by the wire chuck unit 61 as shown in FIG. 35, the control unit 15 moves down the holding jig 27 by controlling the up/down unit 24 of the housing holding unit 12.

Figure 36:
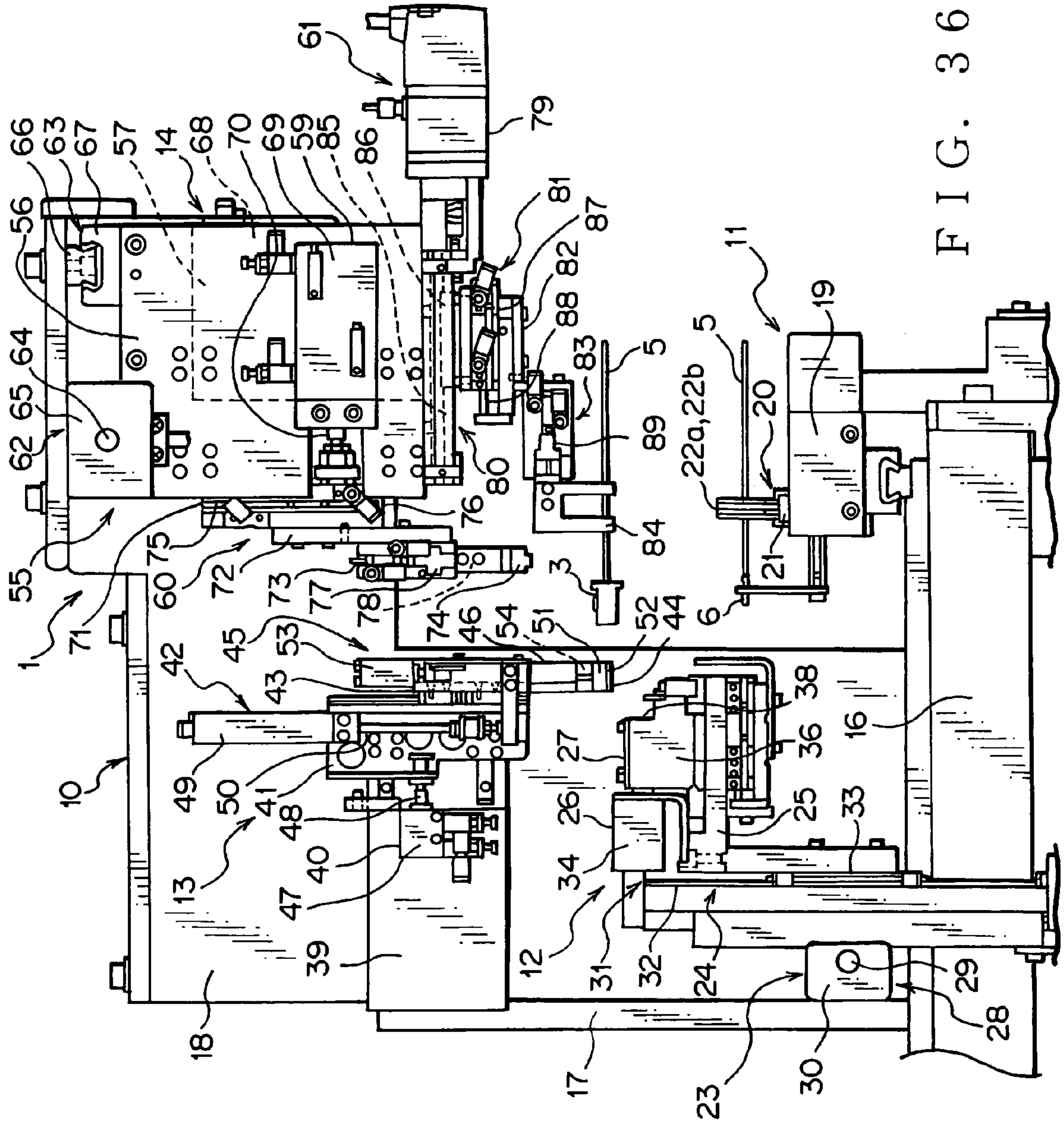
FIG. 36 is a side view showing a condition that the electric wire is positioned above the bar in the condition shown in FIG. 35.
Figure 37:
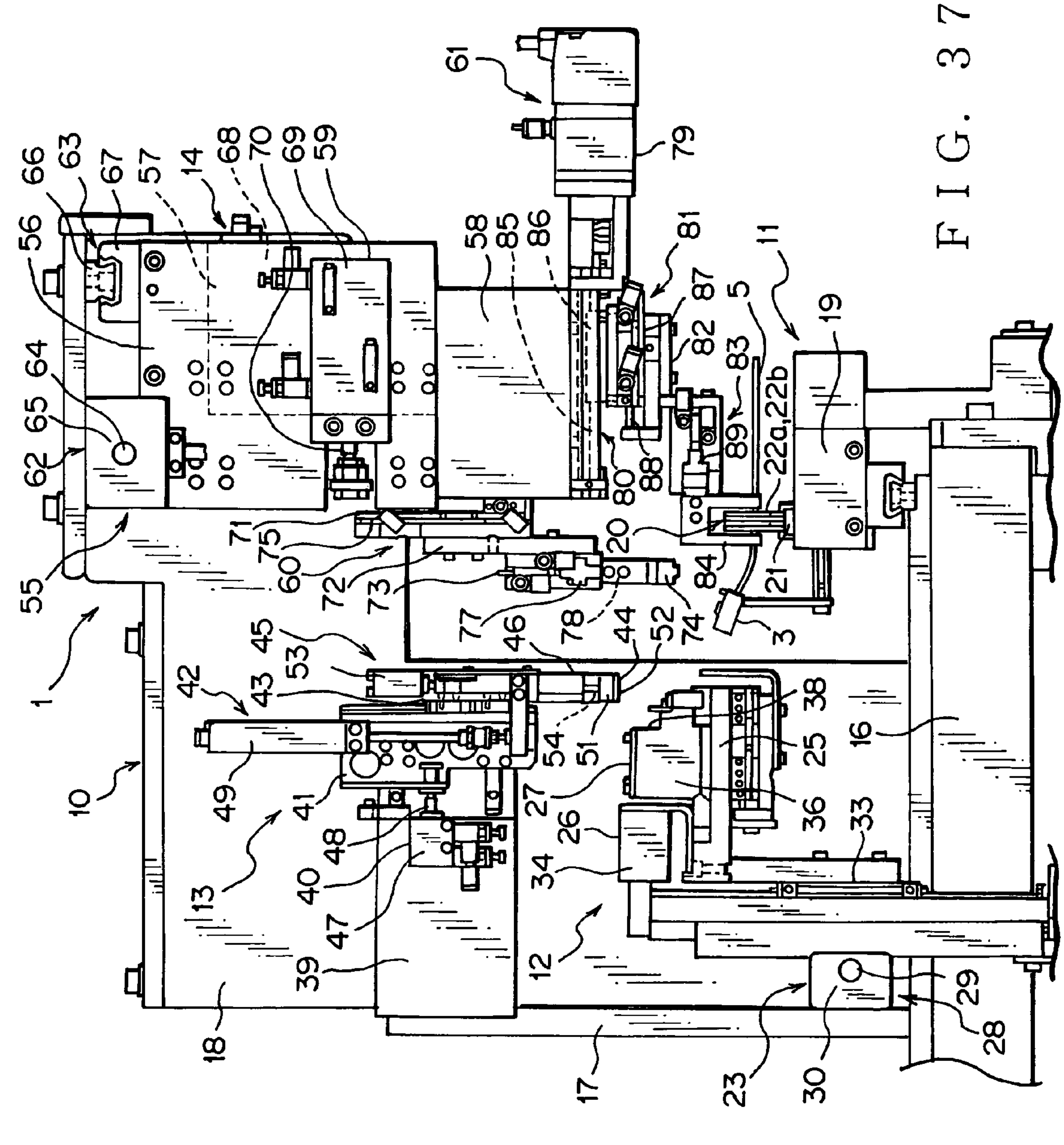
FIG. 37 is a side view showing a condition that the electric wire connected with the connector housing is held by the bar in the condition shown in FIG. 36.
Figure 38:
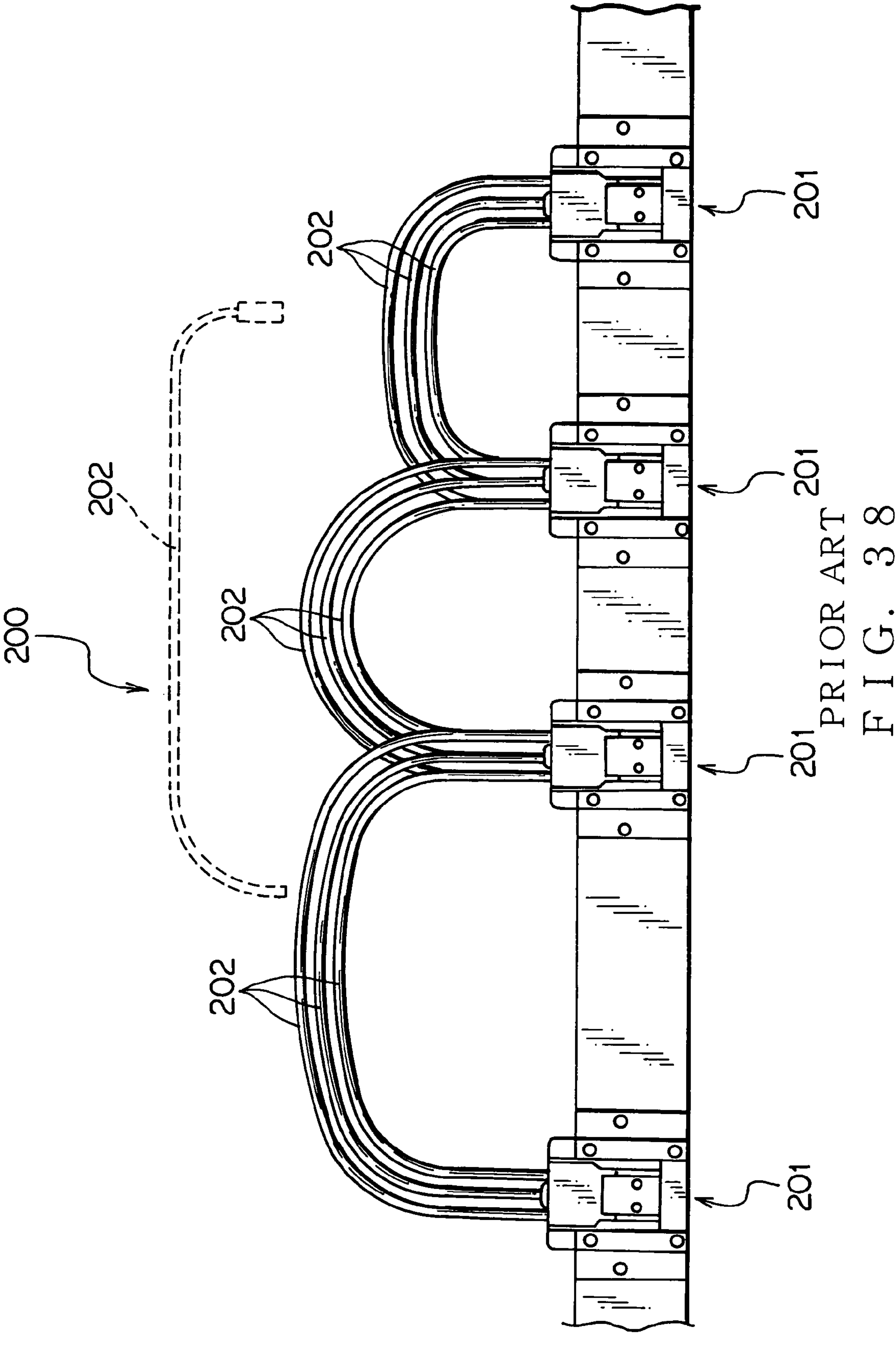
PRIOR ART FIG. 38
FIG. 38 is a plan view showing a part of a terminal inserting apparatus by prior art.

Since the electric wire 5 is chucked by the wire chuck 84, the connector housing 3 falls out from the holding jig 27. Thereafter, the control unit 15 positions the wire chuck 84 above the clamps 22*a*, 22*b* clamping the electric wire 5 connected with the connector housing 3, by controlling the horizontal moving unit 55 of the inserting unit 14, as shown in FIG. 36. The control unit 15 moves down the wire chuck 84 by controlling the up/down cylinder 57 of the inserting unit 14 as shown in FIG. 37 so as to press-fit the electric wire 5, chucked between the wire chuck 84 and connected with the connector housing 3, between the clamps 22*a*, 22*b*. Thus, the electric wire 5 connected with the connector housing 3 is held by the wire holding unit 11.

The aforesaid terminal inserting apparatus 1 grips the holding jig 27 corresponding to the connector housing 3, into which the terminal 6 is next inserted, by one gripping unit 104 during inserting the terminal 6 into the connector housing 3 held in the holding jig 27 mounted on the housing holding unit 12. When it is finished to insert the terminal 6 into one connector housing 3, the control unit 15 transports the holding jig 27 on the support table 25 of the housing holding unit 12 to the pushing-up tray 126 by the other gripping unit 104, and furthermore transports the holding jig 27 to a predetermined position of the jig mounting unit 90 by the jig pushing-up unit 102. After the holding jig 27 is transported to the pushing-up tray 126 by the other gripping unit 104, the holding jig 27 gripped by the one gripping unit 104 is transported to the support table 25 of the housing holding unit 12 by the one gripping unit 104.

In this embodiment, the jig transporting unit 91 transports one holding jig 27 of the plurality of holding jigs 27 held in the jig mounting unit 90 to the support table 25 of the housing holding unit 12 as the inserting/mounting unit, and the inserting unit 14 as the inserting/mounting unit inserts the terminal 6 into the connector housing 3 held in the transported holding jig 27. Thereby, the length of the electric wire 5 is not required to be longer than the interval between the holding jigs 27. Therefore, the terminal inserting apparatus 1 does not give a limitation to an assembled wiring harness.

The jig transporting unit 91 has the jig pushing-up unit 102 for pushing-up one holding jig 27 from the jig mounting unit 90. The interval between the holding jigs 27 at the jig mounting unit 90 can become smaller than that in a case of approaching from upper side of the jig mounting unit 90 to the holding jig for gripping it. Thereby, the terminal inserting apparatus 1 can be miniaturized.

The jig transporting unit 91 has the gripping unit 104 which is movable along the arrow Y as the second direction and grips one holding jig 27 pushed up by the jig pushing-up unit 102. Thereby, the holding jig 27 can be transported securely from the jig mounting unit 90 to the support table 25 of the housing holding unit 12. The gripping unit 104 is movable along the arrow Y as the second direction and not movable along the arrow X as the first direction. Then, the terminal inserting apparatus 1 can be miniaturized relatively with a case that the gripping unit 104 is movable along the arrow X as the first direction.

Since the terminal inserting apparatus 1 has the pair of gripping units 104, one gripping unit 104 can transport the holding jig 27 from the jig pushing-up unit 102 to the support table 25 of the housing holding unit 12. The other gripping unit 104 can transport the holding jig 27 from the support table 25 of the housing holding unit 12 to the jig pushing-up unit 102. Thereby, operating time can be shortened.

After the inserting unit 14 inserts the last terminal, the inserting unit 14 is gripping the electric wire 5 connected with the last inserted terminal 6 and the wire holding unit 11 holds the electric wire 5 connected with the terminal. An operator is not required to make by hand the wire holding unit 11 hold the connector housing 3, into which the terminals 6 are inserted. Thereby, reduction of operating efficiency by hand can be prevented and the connector housing 3 can be placed corresponding to the position where the terminal 6 is mounted at secure position of the bar 20 of the wire holding unit 11.

After the inserting unit 14 inserts the last terminal 6, the holding jig 27 is pushed down. The connector housing 3 can be fallen out securely from the holding jig 27. The inserting unit 14 can make the wire holding unit 11 securely hold the connector housing 3.

After the inserting unit 14 inserts the last terminal 6, the connector-fixing cylinder 26 changes the holding jig 27 to the condition of allowing falling-out. Thereby, the connector housing 3 can be fallen out securely from the holding jig 27. The inserting unit 14 can make the wire holding unit 11 securely hold the connector housing 3.

When the inserting unit 14 inserts the terminal 6, the connector-fixing cylinder 26 positions the holding jig 27 in the condition of limiting falling-out. Thereby, unexpected falling-out of the connector housing 3 from the holding jig 27 can be prevented. Thereby, the terminal 6 can be inserted securely into the terminal receiving chamber 4 of the connector housing 3.

In aforesaid embodiment, the jig transporting unit 91 of the terminal inserting apparatus 1 has both the jig pushing-up unit 102 and the gripping unit 104. According to the present invention, the jig transporting unit 91 can have one of the jig pushing-up unit 102 and the gripping unit 104.

When the jig transporting unit 91 has only the jig pushing-up unit 102, an expanding length of the rod 124 of the slide cylinder 121 and a figure of the housing holding unit 12 may be changed suitably. When the jig transporting unit 91 has only the gripping unit 104, the gripping unit 104 can be movable in both directions of the arrows X and Y. In the present invention, a well-known robot arm can be applied for the jig transporting unit.

In the aforesaid embodiment, one pair of the gripping units 104 of the jig pushing-up unit 102 is provided. According to the present invention, three or more pairs of the gripping units 104 of the jig pushing-up unit 102 can be provided.

Although the present invention has been fully described by way of an embodiment, it is to be noted that various change and modifications can be made with the scope of the present invention as defined by the following claims.

What is claimed is:

1. A terminal inserting apparatus, in which a connector housing is held in a holding jig and inserts a terminal, connected with an electric wire, into a terminal receiving chamber of the connector housing, comprising:

a plurality of holding jigs;

a jig mounting unit on which the plurality of said holding jigs is mounted;

an inserting unit for mounting any one holding jig of the plurality of holding jigs thereon and inserting the terminal into the terminal receiving chamber of the connector housing held in said any one holding jig; and a jig transporting unit for picking up one holding jig of the plurality of holding jigs mounted on the jig mounting unit from said jig mounting unit, and transporting the one holding jig to said inserting unit, wherein the plurality of holding jigs each having a plurality positioning holes arranged at each side wall, a slide member and a coil spring, said holding jigs mounted on the jig mounting unit is arranged in a straight line, and said jig transporting unit includes a pulling-out unit moving freely both in a first direction parallel to the straight line where the plurality holding jigs is arranged and in a second direction intersecting with the first direction , and penetration through the jig mounting unit to pushup one holding jig of the plurality of the holding jigs for pulling out one of the holding jig from the jig mounting unit.

2. The terminal inserting apparatus according to claim 1, wherein the jig transporting unit includes a griping device moving freely in the second direction, and approaching from an upper side to the one holding jig pushed up by the pulling-out unit and gripping the one holding jig for transporting the one holding jig to the inserting unit.

3. The terminal inserting apparatus according to claim 2, wherein said jig transporting unit includes a plurality of said gripping devices.

* * * * *